(12) United States Patent
Slamka

(10) Patent No.: US 9,508,269 B2
(45) Date of Patent: Nov. 29, 2016

(54) REMOTE GUIDANCE SYSTEM

(75) Inventor: Milan Slamka, Camas, WA (US)

(73) Assignee: ECHO-SENSE INC., Camas, WA (US)

( * ) Notice: Subject to any disclaimer, the term of this patent is extended or adjusted under 35 U.S.C. 154(b) by 251 days.

(21) Appl. No.: 13/297,572

(22) Filed: Nov. 16, 2011

(65) Prior Publication Data

US 2012/0062357 A1   Mar. 15, 2012

Related U.S. Application Data

(63) Continuation-in-part of application No. 12/870,458, filed on Aug. 27, 2010.

(60) Provisional application No. 61/414,290, filed on Nov. 16, 2010.

(51) Int. Cl.
G09B 21/00   (2006.01)
G01C 21/20   (2006.01)
A61H 3/06   (2006.01)

(52) U.S. Cl.
CPC .......... *G09B 21/006* (2013.01); *G01C 21/20* (2013.01); *A61H 3/061* (2013.01); *A61H 2201/1604* (2013.01); *A61H 2201/165* (2013.01); *A61H 2201/5048* (2013.01); *A61H 2201/5084* (2013.01); *A61H 2201/5097* (2013.01)

(58) Field of Classification Search
CPC ........ G01S 15/87; G01S 15/88; G01S 15/93; G01S 15/101; G01S 15/938; G01S 13/93; G01S 7/526; G01S 7/527; G01S 7/539; A61H 3/061; G09B 21/0061; G01N 29/07; G01N 29/265
USPC ........... 340/4.11, 4.1; 701/201, 200; 367/87; 345/169; 434/112
See application file for complete search history.

(56) References Cited

U.S. PATENT DOCUMENTS

| | | |
|---|---|---|
| 3,366,922 A | 1/1968 | Kay |
| 4,020,446 A | 4/1977 | Iida et al. |
| 4,216,537 A * | 8/1980 | Delignieres ............. G01S 15/60 367/106 |
| 4,292,678 A | 9/1981 | Kay |
| RE32,252 E | 9/1986 | Kay |
| 4,713,669 A | 12/1987 | Shuch |
| 4,761,770 A | 8/1988 | Kim et al. |
| 4,907,136 A | 3/1990 | Jorgensen |
| 4,928,101 A | 5/1990 | Favors |
| 5,032,836 A | 7/1991 | Ono et al. |
| 5,107,467 A | 4/1992 | Jorgensen et al. |

(Continued)

OTHER PUBLICATIONS

Global Sources—Product Search: Camera sunglasses, http://www.globalsources.com/gsol/GeneralManager?point_search=on&page=search%2FProductSearchResults&product_search=on&supplier_search=off&article_search=off&type=new&search_what=1&query=Camera+sunglasses&point_id=3000000149681&catalog_id=2000000003844&from=&loc=t&AGG=N&supp_list=true&compare_table=true&action=GetPoint&action=DoFreeTextSearch&supp_list=true&compare_table=true&action=GetPoint&action=DoFreeTextSearch, 5 pages, accessed on Apr. 19, 2012.

(Continued)

*Primary Examiner* — Travis Hunnings
*Assistant Examiner* — Omar Casillashernandez
(74) *Attorney, Agent, or Firm* — Kevin D. Jablonski; Lane Powell PC

(57) ABSTRACT

A method of providing assistance from an assistant to a user, wherein the user and the assistant are remote from each other, includes obtaining an image of an area adjacent the user, transmitting the image from the user to the assistant, and displaying the image on a display to the assistant. The method also includes transmitting a message generated by the assistant relating to the image from the assistant to the user and audibly outputting the message to the user.

22 Claims, 13 Drawing Sheets

(56) References Cited

U.S. PATENT DOCUMENTS

| | | | |
|---|---|---|---|
| 5,469,956 A | 11/1995 | Greve et al. | |
| 5,470,233 A | 11/1995 | Fruchterman et al. | |
| 5,495,534 A | 2/1996 | Inanaga et al. | |
| 5,508,699 A | 4/1996 | Silverman | |
| 5,687,136 A | 11/1997 | Borenstein | |
| 5,789,970 A | 8/1998 | Denham | |
| 5,854,843 A | 12/1998 | Jacknin et al. | |
| 5,878,154 A | 3/1999 | Schimmelpfennig | |
| 5,905,464 A | 5/1999 | Lanciaux | |
| 5,973,618 A | 10/1999 | Ellis | |
| 6,069,585 A | 5/2000 | Lanciaux | |
| 6,292,213 B1 | 9/2001 | Jones | |
| 6,452,572 B1 | 9/2002 | Fan et al. | |
| 6,469,956 B1* | 10/2002 | Zeng | 367/116 |
| 6,471,354 B1* | 10/2002 | Cho | 351/233 |
| 6,502,032 B1 | 12/2002 | Newman | |
| 6,522,352 B1 | 2/2003 | Strandwitz et al. | |
| 6,558,050 B1 | 5/2003 | Ishibshi | |
| 6,671,226 B1* | 12/2003 | Finkel et al. | 367/116 |
| 6,774,788 B1 | 8/2004 | Balfe | |
| 6,936,528 B2 | 8/2005 | Koo et al. | |
| 6,940,908 B1 | 9/2005 | Smith | |
| 6,992,592 B2* | 1/2006 | Gilfix et al. | 340/4.11 |
| 7,054,226 B1 | 5/2006 | Hickling | |
| 7,336,226 B2 | 2/2008 | Jung et al. | |
| 7,526,377 B2* | 4/2009 | Wiener et al. | 701/414 |
| 7,598,976 B2 | 10/2009 | Sofer et al. | |
| 7,623,965 B2* | 11/2009 | Green | 701/436 |
| 7,806,525 B2* | 10/2010 | Howell et al. | 351/158 |
| 7,855,657 B2* | 12/2010 | Doemens et al. | 340/686.6 |
| 2002/0005778 A1 | 1/2002 | Breed et al. | |
| 2002/0194005 A1 | 12/2002 | Lahr | |
| 2003/0014186 A1 | 1/2003 | Adams, Jr. et al. | |
| 2003/0144814 A1 | 7/2003 | Hama et al. | |
| 2005/0080935 A1 | 4/2005 | Fukae et al. | |
| 2005/0198063 A1 | 9/2005 | Thomas et al. | |
| 2005/0208457 A1* | 9/2005 | Fink et al. | 434/112 |
| 2006/0098089 A1 | 5/2006 | Sofer | |
| 2006/0132382 A1 | 6/2006 | Jannard | |
| 2006/0239119 A1* | 10/2006 | Hartka | G01S 13/90 367/87 |
| 2007/0018890 A1 | 1/2007 | Kulyukin | |
| 2007/0212668 A1 | 9/2007 | Takami et al. | |
| 2007/0214277 A1 | 9/2007 | Ahmed et al. | |
| 2007/0238074 A1* | 10/2007 | Espenlaub et al. | 434/112 |
| 2008/0170118 A1 | 7/2008 | Albertson et al. | |
| 2008/0180537 A1 | 7/2008 | Weinberg et al. | |
| 2008/0218324 A1* | 9/2008 | Li | G01S 15/42 340/435 |
| 2008/0263912 A1* | 10/2008 | Gharsalli | E02F 3/844 37/382 |
| 2008/0266669 A1 | 10/2008 | Durner et al. | |
| 2009/0057428 A1* | 3/2009 | Geadelmann et al. | 236/51 |
| 2009/0295918 A1 | 12/2009 | Horovitz et al. | |
| 2010/0296076 A1 | 11/2010 | Jiang et al. | |
| 2011/0170005 A1 | 7/2011 | Bornstein et al. | |
| 2011/0249122 A1 | 10/2011 | Tricoukes et al. | |

OTHER PUBLICATIONS

Final Office Action dated Jun. 14, 2013 U.S. Appl. No. 12/870,458, filed Aug. 27, 2010.
Office Action dated Dec. 10, 2013, U.S. Appl. No. 12/870,458, filed Aug. 27, 2010.
International Search Report dated Jun. 26, 2013, International Application No. PCT/US2013/026915, International Filing Date: Apr. 2, 2013.
Written Opinion dated Jun. 26, 2013, International Application No. PCT/US2013/026915, International Filing Date: Apr. 2, 2013.
International Search Report dated Feb. 22, 2012, International Application No. PCT/US2011/061038, International Filing Date: Nov. 16, 2011.
Written Opinion dated Feb. 22, 2012, International Application No. PCT/US2011/061038, International Filing Date: Nov. 16, 2011.
Final Office Action dated Sep. 25, 2014 U.S. Appl. No. 12/870,458, filed Aug. 27, 2010.
Office Action dated Jan. 28, 2014 U.S. Appl. No. 12/870,458, filed Aug. 27, 2010.
Office Action dated Nov. 24, 2014 U.S. Appl. No. 12/870,458, filed Aug. 27, 2010.
Final Office Action dated Apr. 3, 2015 U.S. Appl. No. 12/870,458, filed Aug. 27, 2010.
Office Action dated Mar. 11, 2015, U.S. Appl. No. 13/770,870, filed Feb. 19, 2013.
Office Action dated Sep. 22, 2015, for U.S. Appl. No. 13/770,870, filed Feb. 19, 2013.
Office Action dated Apr. 7, 2016, for U.S. Appl. No. 13/770,870, filed Feb. 19, 2013.
Office Action dated Sep. 9, 2016, for U.S. Appl. No. 141580,016, filed Dec. 22, 2014.
Final Office Action dated Oct. 6, 2016, for U.S. Appl. No. 13/770,870, filed Feb. 19, 2013.

* cited by examiner

Obstacle detection and location is a function of head orientation

Sensor Array

Object

REMOTE GUIDANCE SYSTEM

CROSS-REFERENCE TO RELATED APPLICATIONS

This application claims the benefit of U.S. Provisional Application No. 61/414,290, filed on Nov. 16, 2010. The entire disclosure of the above application is incorporated herein by reference.

This application is also a continuation-in-part of U.S. patent application Ser. No. 12/870,458 filed on Aug. 27, 2010. The entire disclosure of the above application is incorporated herein by reference.

FIELD

The present disclosure generally relates to guidance systems and, more specifically, to remote guidance systems that can be used, for instance, for assisting visually-impaired users.

BACKGROUND

Visual impairment affects millions of people worldwide and can be debilitating and isolating. Visually impaired (e.g., blind) people face many problems. For instance, vision impairment may make some persons feel unsafe when in unfamiliar surroundings, can make completing unfamiliar tasks difficult, etc. The visually impaired population can familiarize themselves with surroundings such as their homes, places of employment, and/or schools. However, these environments change over time and pose new, unexpected threats to the visually impaired. Additionally, new environments and unfamiliar routes to and from any environment are filled with obstacles that can harm the visually impaired person or make it very difficult for the visually impaired person to navigate successfully through the environments.

Assistive techniques and devices have been developed for the visually impaired. One technique is called echolocation in which a visually impaired person learns to interpret echoes of the sounds that bounce off of objects within the near vicinity of the visually impaired person. This process is similar to how a bat detects objects in the dark. Echolocation can be a very useful technique, but it is difficult to learn and can be inadequate in providing information sufficient to help a visually impaired person successfully navigate through an environment. Most often, the visually impaired find echolocation to be more burdensome than beneficial to help them navigate through an environment.

For example, echolocation has been performed by visually impaired people by tapping an assistive device, such as a cane, or his or her foot or hand on an object. The "echoes" received back or the sounds that emanate from the objects after being struck indicate to the visually impaired person some information about the objects, such as its size, shape, and/or contour. Echolocation may be used when a visually impaired person comes across one or more steps. By tapping a cane or his or her foot, the visually impaired person can interpret the sounds emanating from the step to determine the shape and depth of the step so that the visually impaired person can safely navigate the steps. However, this process is very difficult, inefficient, and time-consuming.

Accordingly, despite the benefits of known assisted guidance navigation for the visually-impaired, there remains a need for efficient, useful, user-friendly devices that do not compromise accuracy or utility.

SUMMARY

The teachings of the present disclosure overcome these and other shortfalls with the disclosed remote guidance system and related methods of providing guidance remotely.

A system for providing assistance from an assistant to a user is disclosed, wherein the user and the assistant are remote from each other. The system includes a user device that includes a visual data collector and an audible output device. The visual data collector is operable to obtain an image of an area adjacent the user, and the audible output device is operable to audibly output a message relating to the image to the user. Furthermore, the system includes an assistant device including a display and an assistant input device. The display is operable to display the image to the assistant, and the assistant input device is operable for inputting the message by the assistant. Moreover, the system includes a communication device that is operable to transmit the image from the user device to assistant device. The communication device is also operable to transmit the message from the assistant device to the user device.

A method of providing assistance from an assistant to a user is also disclosed, wherein the user and the assistant are remote from each other. The method includes obtaining an image of an area adjacent the user, transmitting the image from the user to the assistant, and displaying the image on a display to the assistant. The method also includes transmitting a message generated by the assistant relating to the image from the assistant to the user and audibly outputting the message to the user.

Moreover, a method of providing assistance from an assistant to a vision-impaired user is disclosed, where the user and the assistant are remote from each other. The method includes obtaining a moving image of an area adjacent the vision-impaired user. The moving image is obtained from a portable camera that is transportable by the vision-impaired user. The method also includes transmitting the moving image from the vision-impaired user to the assistant and displaying the moving image on a display to the assistant. Furthermore, the method includes determining a current position of the vision-impaired user on a map and displaying the map and the current position on the display to the assistant. Additionally, the method includes displaying a destination of the vision-impaired user on the display to the assistant. Still further, the method includes transmitting a route message generated by the assistant from the assistant to the vision-impaired user, wherein the route message includes the route message including a plurality of directions for travelling from the current position of the vision-impaired user to the destination. The route message also includes avoidance information for avoiding an obstacle shown in the moving image. Additionally, the method includes audibly outputting the route message from a speaker to the vision-impaired user, wherein the speaker is transportable by the vision-impaired user.

This section provides a general summary of the disclosed remote guidance system, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
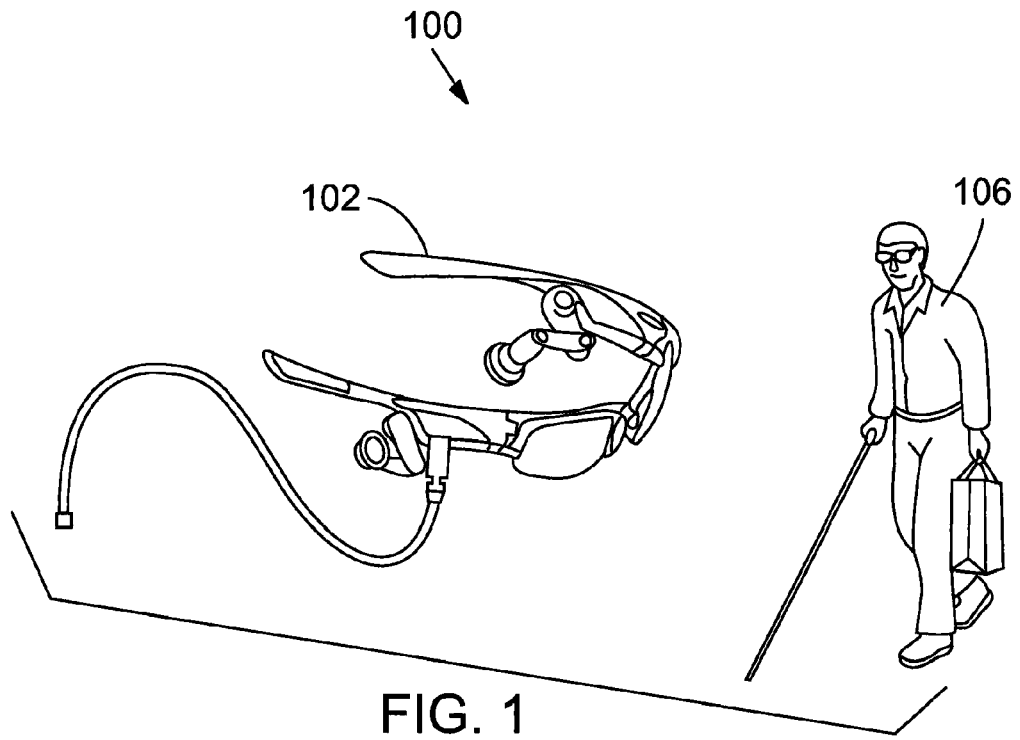
FIG. 1 illustrates an isometric view of an exemplary head-mounted device of a guidance system of the present disclosure.

Referring now to the Figures, various exemplary embodiments of an assisted guidance navigation of the present disclosure will be discussed. The assisted guidance navigation system may include any suitable embodiment including head-mounted devices (e.g., sunglasses or other eyewear, visors, headbands, etc.), chest or torso-mounted devices, guide-dog mounted devices, and/or any other devices that are suitable for assisting a user with guidance and assistance. The system can incorporate one or more teachings of Applicants' co-pending patent application Ser. No. 12/870,458, filed Aug. 27, 2010, which is hereby incorporated by reference in its entirety.

The disclosed assisted guidance navigation systems and methods assist a user within an environment and/or to a destination. For example, a user may wish to navigate within a neighborhood while going on a walk with no precise destination. With the disclosed assisted guidance navigation systems and methods, this user is able to avoid objects in his or her pathway that are on a path to collide with the user during travel, is able to identify objects within the user's short range environment, and also is able to geographically identify where the user is located (e.g., at which cross-streets the user is stopped or traveling near). In another example, the user wishes to travel to a particular destination. The disclosed assisted guidance navigation systems and methods guide the user to a particular destination with information received from a transducer (e.g., an ultrasonic transducer), while also assisting the user to avoid objects in his/her pathway and to identify objects within the near range environment of the user. Piezoelectric and/or electrodynamic transducers may be used. For example, speakers operating in a frequency range of 30-90 kHz may be used. Any suitable one or more transducer(s) can provide feedback to the user.

The user's environment includes a plurality of objects. The navigation system is capable of detecting all of the objects within the user's environment. The feedback that would be useful to the user does not include information relating to every object within the user's environment. Rather, the navigation system performs a prioritization of the objects within the user's environment to determine which objects are most important for the user to receive information about. The navigation system prioritizes the objects based on various characteristics such as whether the user is on a pathway to collide with the object, whether the object is in close proximity to the user, whether the object is positioned along a known pathway that the user is interested in pursuing (e.g., a user who is traveling along a planned route to a particular destination), etc. Such characteristics are detected by the various sensors in the navigation system. The navigation system may incorporate any number and type of rules associated with prioritizing the objects within a user's environment. For example, one rule is that all objects likely to collide with the user's known path are assigned a high priority level to provide the user with audible feedback on how to avoid these objects and stationary objects having a low likelihood of colliding with the user's path are assigned a low priority level and the user may not be provided with audible feedback about these objects.

In an embodiment illustrated in FIG. 1, a navigation system 100 comprises a head-mounted device 102, such as sunglasses, with a sensor array 104 to detect objects within an environment of a user 106, and an external main processor module operatively coupled thereto to provide data (e.g., instructions) and optionally request information. The navigation system 100 may include a motion-detector (e.g., an accelerometer) to determine the user's movement, a location-determining device (e.g., a GPS) to determine the user's location, a camera to visually identify the objects, an audible feedback system, and optionally a voice recognition system to process voice commands. A transceiver can provide wireless communications, and a power supply can provide power to the electronic components. A processor operatively coupled to these components can identify a distance and direction of objects, retrieve object information by way of GPS coordinates, report features of the object responsive to captured voice commands, provide audible feedback and perform cellular communication functions in response to a user 106 directive or in automatic response to a condition, such as, a warning or danger event.

FIG. 1 depicts an exemplary embodiment of an assisted guidance navigation system 100 in a "sunglasses" embodiment. The sunglasses 100 can be used for assisted guidance navigation. The head-mounted device senses where objects are positioned within the user's environment and provides audible feedback to the user. The head-mounted device 100 (sunglasses, in this example) "looks" in the direction of the user when the user 106 moves his or her head and in conjunction with local sensor information (e.g., abrupt movements by way of an accelerometer) navigates the user 106 within the environment and/or to a destination in a safe manner.

Figure 2:
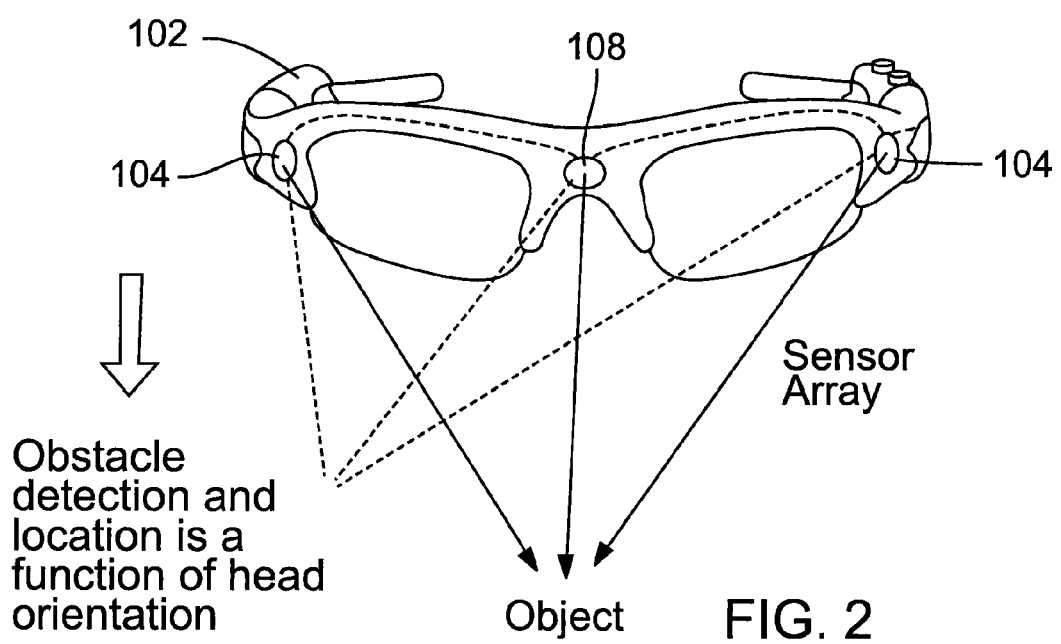
FIG. 2 illustrates a front view of the head-mounted device illustrated in FIG. 1.

FIG. 2 shows one embodiment of the sunglasses 100 with a sensor array 104. It comprises optical or acoustic based transducers, any combination thereof, and/or any other sensors to perform object ranging. As one example, but not so limited, the sensor array 104 comprises ultrasonic transducers to transmit and receive ultrasonic pulses for detecting objects. The sensor array 104 includes one or more sensors that in conjunction with a controller perform ultrasonic ranging to precisely track objects within the vicinity of the user 106. The sensor array 104 detects information about where the user 106 is "looking", the user's head orientation (direction, angle, elevation), and local information, such as, the user's motion.

In this embodiment, the array of ultrasound transducers emit a unique sequence of ultrasonic bursts that includes multiple signals having different frequencies, perform processing on the echo return signals of the ultrasonic bursts, detect object distances and positions of objects in the user's environment in accordance with principles of echolocation and identify objects in the surrounding environment. The navigation system further provides the user with audible notification and feedback to guide and direct the user within the user's environment. By way of these elements, the navigation system permits the user to sonically interpret the user's environment in a manner consistent with echolocation principles.

The sensor array 104 performs echo-location to track objects within the user's environment and assist the user 106 with short-range mobility, object avoidance, and long-range navigation. The short range system identifies objects within the user's environment and provides guidance for avoiding nearby objects that are either stationary or moving along a path that may collide with the user 106 or for navigating the user 106 to a destination. Long range navigation supplements short range mobility by way of a location-determination system, such as GPS, as will be explained ahead. A view of the area in front of the sunglasses 102 is approximately a 120 degree conical section. The view may be a shape. For example, the view of the area in front of the sunglasses 102 may be a conical section of a space that is at least 60 degrees but does not exceed 120 degrees. Details of echo return signals received by the navigation system 100 can be represented in spherical co-ordinate (theta, phi) or represented in a Cartesian co-ordinate system.

The disclosed systems and methods for assisting users with guided navigation are usable in an environment in which multiple users have such a navigation system without the signals from each user interfering with one another. A unique identifier is assigned to the signal(s) transmitted by each user's device. Any suitable number of users may be present in the same environment and a different unique identifier is assigned to the signals transmitted by each user's device. Such a configuration prevents signal confusion or interference from other users' devices' signals. In some examples, the signals transmitted from a first user's device in a multi-user environment are encoded with a first unique identifier. The first user's device includes a first encoder that encodes the first user's transmitted signals with the first unique identifier, in this example. The first user's device also includes a first decoder that is coupled to the signal receiver of the first user's navigation system. The first decoder permits the signals with the first unique identifier that are received by the first navigation system to be processed by the first user's device and may prevent signals with any other unique identifier from being processed by the first user's device. In some examples, the first user's device also processes signals from another user's device so that the first user can communicate with the other user, but only permits signals with the first unique identifier to be processed as signals that help the first user navigate within his or her environment.

The unique identifier is any suitable unique identifier. For example, the unique identifier is a code electronically encoded within the signal(s) emitted from the user's device in some embodiments. In a more specific example, the signal(s) from the user's device are encoded with an electronic serial number, as discussed in greater detail below. In other embodiments, the unique identifier is a unique sound associated with the signal(s) transmitted from the user's device. In this example, the unique sound may be a ring tone (similar to a unique ring tone on a cellular phone) selected by the user. The user serves as the "decoder" in the sense that he or she will listen only to the signals that have his or her unique ring tone, in this example. Any suitable electronic coding of the signals emitted from the user's device may be used to assign a unique identifier to the signals. In yet other examples, a first user's device is programmable to accept signals from a second user's device such that the first user and the second user are able to communicate with each other. A first user's device may be programmable to receive signals from any other number of other user's devices. This accept/reject of other user's signals may be performed by electronic "handshaking" between the devices of any suitable form.

The user's device can sense other user's devices by any suitable means including the near range sensors (e.g., a plurality of ultrasonic transducers) and/or far range sensor(s) (e.g., GPS). The user's device has a defined limit within which the user's "environment" is defined. The defined limit or radius of space that at least partially surrounds the user is defined by the distance within which it is practical or useful for the user to know his or her surroundings. For example, the user may wish to know his or her surroundings within a conical shape of about 30 feet of the user (a typical user's forward "line of sight"). The short-range sensors in the user's device can detect other users' devices (along with the objects) within the 30 foot space and a long range sensor, GPS, can detect the user's geographical location. In this example, the GPS may determine that the user is about to encounter another user device within a range greater than the space within which the short range sensors can detect, perhaps about 100 feet, for example.

The device also may be used to search for another user within a particular space around the user. For example, two users may be assisted by the disclosed guidance navigation systems to find each other in a park, shopping mall, or other relatively crowded location. The GPS sensors for each of the two users can identify each user's geographical location with respect to the other user via the emitted encoded signals that uniquely identifies each user. The device can then provide each user with verbal or other audible instructions regarding the other user's geographic location and can direct the users to each other. Once both users come within range of each other's short range sensors (e.g., the ultrasound transducers), then the users are optionally able to communicate with each other over the short range transmitters and receivers (or any other suitable means). Also, in some embodiments, GPRS transmission of the GPS latitude and longitude coordinates of the users can enable the users to find each other.

In the system described above in which multiple users have an assisted navigation system, the multiple users' systems can use the information received from other users' systems to enhance the short-range, long-range, and object detection and avoidance capabilities of the user's system. For example, each user's assisted navigation system is able to detect signals (echoes) from their own system to detect objects within an environment and is able to detect signals from other users' systems to gain additional information about the objects within the environment. The signals received by the user's systems that are generated by other users' systems enhance the information that the user's system receives about the objects within the environment. The user's system is able to distinguish between the user's system's signals and the other signals and process the information from the other users' systems from the other users' perspective such that the user's system detects objects within the environment from many perspectives, including the user's perspective and the perspective of the other users that are sending signals.

Additionally, a database of information about an environment is compiled in one example through one or more users' systems. In this example, the database is updated when a user enters an environment with any information about the objects within the environment detected by the user's assisted navigation system. Either when that user re-enters that environment or another user enters that environment, the database can be accessed by the assisted navigation system(s) used by any user to gain additional institutional knowledge about the environment.

One or more navigation systems within close proximity to one another, for example, by way of ad-hoc and peer-to-peer communication, can adjust operational parameters to communicate amongst one another and operate without interference to each other. As an example, transmit and receive frequencies can be adjusted based on direction and distance to other sunglasses within proximity of the user. As one example, each sunglasses device can transmit a signal with an encoded serial number permitting detection filters to focus on specific returns. GPS location can be also used to determine when users of the sunglasses are in near proximity. In such cases, the users can communicate directly with other sunglasses 100 as will be described ahead, for example, through voice communication, or audible feedback.

Echolocation works like active sonar, using sounds made by the sensor array. Ranging is done by measuring the time delay between the sensor array's own sound emission and any echo signals that return from the environment. Unlike some sonar that relies on an extremely narrow beam to localize a target, the sensor array echolocation relies on multiple receivers. Referring again to FIG. 2, the sensor array has at least two sensors positioned slightly apart. The echoes returning to the two sensors 104 arrive at different times and at different sound levels, depending on the position of the object generating the echoes. The time and level differences are used to identify direction. With echolocation the user 106 can see not only where he or she is going but can also see how big the object in front of the user 106 is and other features as well.

The sensor array 104 can comprise both narrowband and broadband ultrasound transmitters and receivers (30 to 100 KHz) (or transceivers) that localize received signals by triangulation. In this example, at least 3 broadband ultrasound receivers and 1 broadband directed source with spread of approximately 120 degree conical section can be used. Broadband signal transmission includes sending more than one signal in which at least two of the signals have different frequencies. The frequencies of these broadband signals range from 20 kHz to 100 kHz (e.g., 30 to 90 kHz) in the ultrasound range, as disclosed in the example above. However, it will be appreciated that the broadband signals can exceed 100 kHz in some embodiments. Any suitable type of sensor may be included in the disclosed assisted guidance navigation systems and methods. At least two of the sensors in the disclosed systems and methods emit signals having different frequencies. The receivers will receive back the "echoes" of these signals (the signals after they have encountered an object(s)) having different frequencies after they have encountered an object within the environment of the user. Such a multi-frequency system provides the user with feedback that is very realistic to the actual environment.

For example, the navigation system is able to identify objects within his/her environment and how they relate to the speed and direction at which the user is moving and the speed and direction at which the object (e.g., another person or a vehicle) is moving or the speed at which the user is approaching a stationary object. For example, the navigation system detects up to 30 objects within the user's environment. The navigation system is able to detect any suitable number of objects within the user's environment. Such a navigation system creates a "virtual" environment for the user that emulates the actual environment within which the user is moving. The "virtual" environment created for the user includes objects that produce audible feedback through echo-location with sound waves emitted from the navigation system in a three-dimensional sense with respect to the user's position and movement. The user hears a beep or other audio feedback to describe where an object is located in the environment. The beep remains constant if the user remains stationary and changes in volume and/or "location" when the user moves with respect to the object. For example, a user moving closer to an object hears a louder beeping sound as the user approaches the object. In another example, a user turning his or her head will still hear the beeping coming from the same source, which is the "virtual" equivalent to where the object is located within the user's environment. The user's voice commands can also be used as input for creating the virtual environment.

The virtual environment is communicated to the user through audible messaging. In some examples, the user hears beeping, ringing, or other sounds that indicate that the user is approaching an object or an object is approaching the user. In some other examples, the user hears a verbal message providing the user with information relating to objects within his or her environment. In addition to the audio feedback, the user still hears the actual sound produced by the object within his or her environment (if it makes any sounds). An example of this phenomenon is a passing car that emanates sound as it physically passes a user and the echo signals created when the signals emitted by the user's navigation system encounter the car within the user's environment. The user will "hear" the car in two different ways—actual sound from the car physically passing by the user and the virtual sound that is created by the navigation system.

In this broadband example, reflection and therefore obstacle location is directly related to where the user is pointing his or her head. This can be achieved with transducers on any head-mounted device, as illustrated in FIG. 2. Configuration of the transducers may include a transmit/receive transducer 108 in a "nose rim" of an eyewear or sunglasses example, and receive transducers hidden behind what normally appears as lenses to the sunglasses. Sunglasses can contain an expansion slot to accommodate an Infrared Detection Module to allow discriminate living bodies and a magnetic compass module and an acceleration MEMS module.

Figure 3:
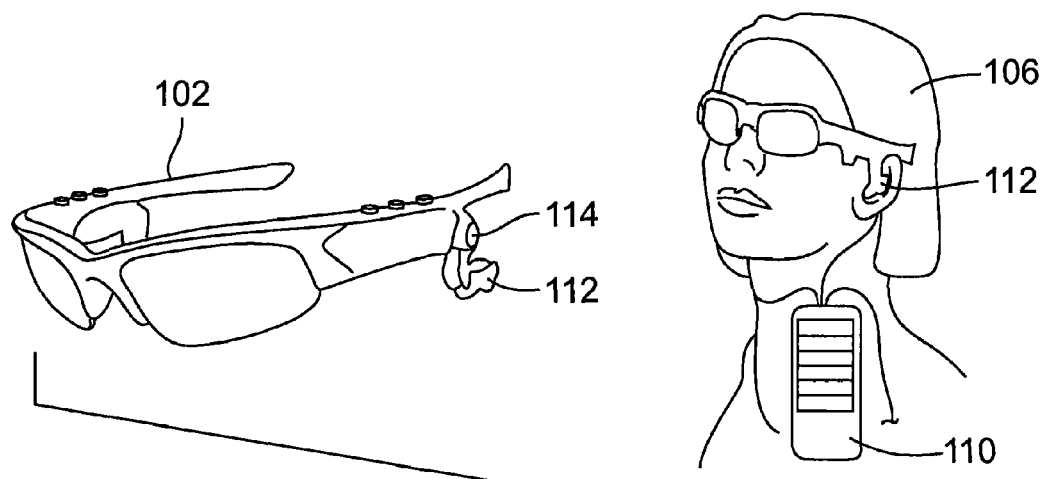
FIG. 3 illustrates another isometric view of the exemplary head-mounted device of the guidance system.

FIG. 3 shows a perspective view of the sunglasses 102 operatively coupled to a shoulder pack 110 that packages components for operation as will be described ahead. In some embodiments, the shoulder pack 110 can be a cellular telephone that can be operably connected to the sunglasses 102 (e.g., via the USB router). The shoulder pack 110 (cellular phone) can include a Global Positioning System (GPS) Electronic Compass, voice recognition software, and/or Ultrasonic Navigation and an echo signal detection system. In the current embodiment, the sunglasses 102 contain ultrasonic transducers for emitting output signals and receiving return echo signals.

The location and motion of the obstacles relative to the user 106 are communicated by a series of sound signals sent to earpieces 112 on the sunglasses 102. Audible messages emitted from the earpieces 112 identify the object and its location relative to the user 106 to help the user 106 avoid collisions with these obstacles. Auditory spatialization of sound cues provides a perceptual comprehension of the user's physical environment. The user 106 also can say voice commands to the sunglasses 102 by way of one or more microphones 114. The GPS voice activated system is used for long range navigation to guide the user 106 to a mapped location. The long-range system audibly maps out the destination and associated landmarks and tracked objects (e.g., buildings and vehicles) and may provide audible instructions that help navigate the user 106 to a destination. Any other type of long range system can be used. For example, one or more sensors, such as an accelerometer detect movement of the navigation system and can determine long-range navigation based on a pre-determined map or route. Some navigation systems include both a GPS and a sensor(s) that provide the user with long range system capabilities. In this example, if the GPS is unusable (e.g., such as in a shopping mall or tunnel), then the sensor(s) detect the movement of the navigation system and can provide long range navigation guidance to the user based on the known GPS maps or established route. Furthermore, in shopping malls and other similar environments, navigation can be completed using "Dead Reckoning" by using a previously determined position and advancing that position based upon known or estimated speeds of the user over elapsed time and the known route of the user (e.g., using the 3D sensors and map overlays discussed herein).

Drive and receive electronics can be contained on a printed circuit board (PCB) inside of the rim of the sunglasses 102 and contain analog interface circuitry, A/D and D/A circuits and DSP or a microprocessor and is called the "peripheral processing module". Power can be delivered via a USB cable to the processing module. The communication between the processing module and the main processor module occur via the USB cable. The sunglasses 102 contain a large capacitor for smooth energy delivery and filtering of transients from bursty operation, however all of the power can be delivered via the USB cable from the main processor unit of the shoulder pack 110.

Figure 4:
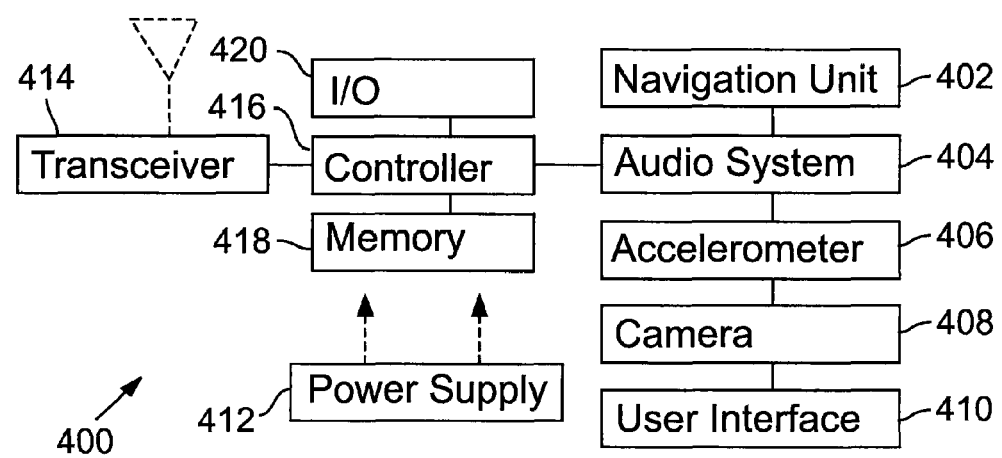
FIG. 4 illustrates a block diagram of various electronic components of the guidance system illustrated in FIGS. 1-3.

An exemplary component list for the navigation system is as follows, although more or less than the number of components may be constructed therein:
  Processor Module with A/D and D/A and ROM & RAM
  Ultrasound Transducer (e.g., placed on center rim)
  Ultrasound Stereo Receiver (e.g., part of lens assembly)
  Audio Stereo Earbuds (e.g., non occlusive, possible tube)
  Speech pick-up with directional microphone
  Sound pick-up omni-directional microphone
  USB Connector to Processor Module FIG. 4 depicts an exemplary block diagram of the main processing module 400 (in an embodiment the main processing module is located in a shoulder pack). The main processor module 400 provides data, instructions and requests to the navigation system (peripheral processing module). The peripheral processing module responds with acknowledgements and an executed request and provides resulting data to the main processing module 400. As illustrated in FIG. 4, the main processing module 400 includes a navigation unit 402 that combines ultrasonic ranging for short-range navigation (adaptive up to 50 feet) with a voice activated GPS location system for long-range navigation and guidance.

By way of the audio system 404, location and motion of the obstacles relative to the user are communicated by a series of sound signals sent to audible feedback on the navigation system. The audio system 404 generates these audible messages to identify the object and its location relative to the user to help the user avoid collisions with the objects. Moreover, the audio system 404 provides auditory spatialization of sound cues to provide a perceptual comprehension of the user's physical environment.

The audio system 404 also includes voice recognition capabilities that recognize voice directives from the user by way of a microphone. By way of this voice recognition, the user can issue voice commands to interact with the navigation system. For instance, the user can request information such as location or direction data, directions, map updates, time sensitive data, or perform voice communication functions such as placing a phone call, retrieving voice mail, or sending voice mail.

The navigation system can utilize known technology such as a GPS (Global Positioning System) receiver that can intercept satellite signals and therefrom determine a location fix of the navigation system. The combined GPS voice activated system is used for long-range navigation to guide the user to a mapped location, and provides programming and control functions. The long range system maps out the destination and associated landmarks and tracked objects on the path to the destination (e.g., points of interest, restaurants, stores, libraries, hospitals, etc.) and provides audible instruction to help the user navigate to the destination and avoid objects within the user's path (or avoid objects that are likely to cross the user's path). The navigation system in addition to GPS functionality further comprises a magnetic orientation module that operates on the earth's magnetic field.

The main processing module 400 also includes an accelerometer 406 that measures the acceleration it experiences relative to gravity or motion. Single- and multi-axis MEMS models detect magnitude and direction of the acceleration as a vector quantity, and can be used to sense orientation, vibration and/or shock. By way of the accelerometer 406 the navigation system can determine it the user abruptly moves or falls for emergency response reporting. It can also sense rotation of the navigation system.

The main processing module 400 also includes a camera 408 that records images, either as a still photograph or as a video stream. The images can be compressed and encoded. The navigation system can process the images for identifying relevant information in the user's environment such as objects in the near vicinity. Through this process, the navigation system may optionally be able to identify the type of object(s) within the user's environment. This can include identifying the type of object (e.g., building, car, person, etc.).

The main processing module 400 also includes a user interface 410 that permits the user to interact and operate the navigation system. The user interface 410 can comprise an electronic Braille keypad that is electronically coupled to the navigation system or located peripheral to the navigation system on an external module such as a shoulder pack. In conjunction with the audio system 404, the user interface 410 can instruct the user through a set of prompts.

Furthermore, in some embodiments, the user interface 410 can include a voice recognition module, which enables the user to speak various commands, which are automatically recognized for operating the device. The voice recognition module can recognize any suitable vocalized command. Moreover, the device can include an automated voice prompt that the user can hear, and the voice prompt can ask the user various questions of the user. The user's responses to these questions can be used to clarify the user's commands.

The main processing module 400 also includes a power supply 412 that utilizes common power management technologies such as replaceable batteries, supply regulation technologies, and charging system technologies for supplying energy to any components of the navigation system and to facilitate portable applications. In stationary applications, the power supply 412 can be modified so as to extract energy from a common wall outlet and thereby supply DC power to the components of the navigation system. Also, in some embodiments, the power supply 412 can include a separate battery or charging module. The device can be selectively connected to the charging module, and the charging module can supply additional power if the internal battery of the device is running low on power. In some embodiments, the charging module can extend the operating life of the device up to three times its operating life when running on internal batteries.

In a wireless communications setting, a transceiver 414 of the main processing module 400 (or expansion slot) can utilize common technologies to support individually or in combination any number of wireless access technologies including, but not limited to, cordless phone technology (e.g., DECT), Bluetooth™ 802.15, Wireless 802.11 a/b/g/n, Worldwide Internet access 802.16, Ultra Wide Band (UWB), software defined radio (SDR), and cellular access technologies such as 3G, 4G, CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the terminal device (e.g., the sunglasses). It should be noted also that next generation wireless access technologies can be applied to the present disclosure.

The main processing module 400 also includes a controller 416 that utilizes computing technologies such as a microprocessor and/or a digital signal processor (DSP) with associated storage memory 418 such a Flash, ROM, RAM, SRAM, DRAM or other like technologies for controlling operations of the aforementioned components of the terminal device. The Input/Output 420 permits portable exchange of information or data for instance by way of a Universal Serial Bus (USB). As one example, the controller 416 can be an embedded platform running an operating system (OS) such as Windows Mobile® or Android®. In the latter, Java (compiled) can interface over Linux.

Figure 5:
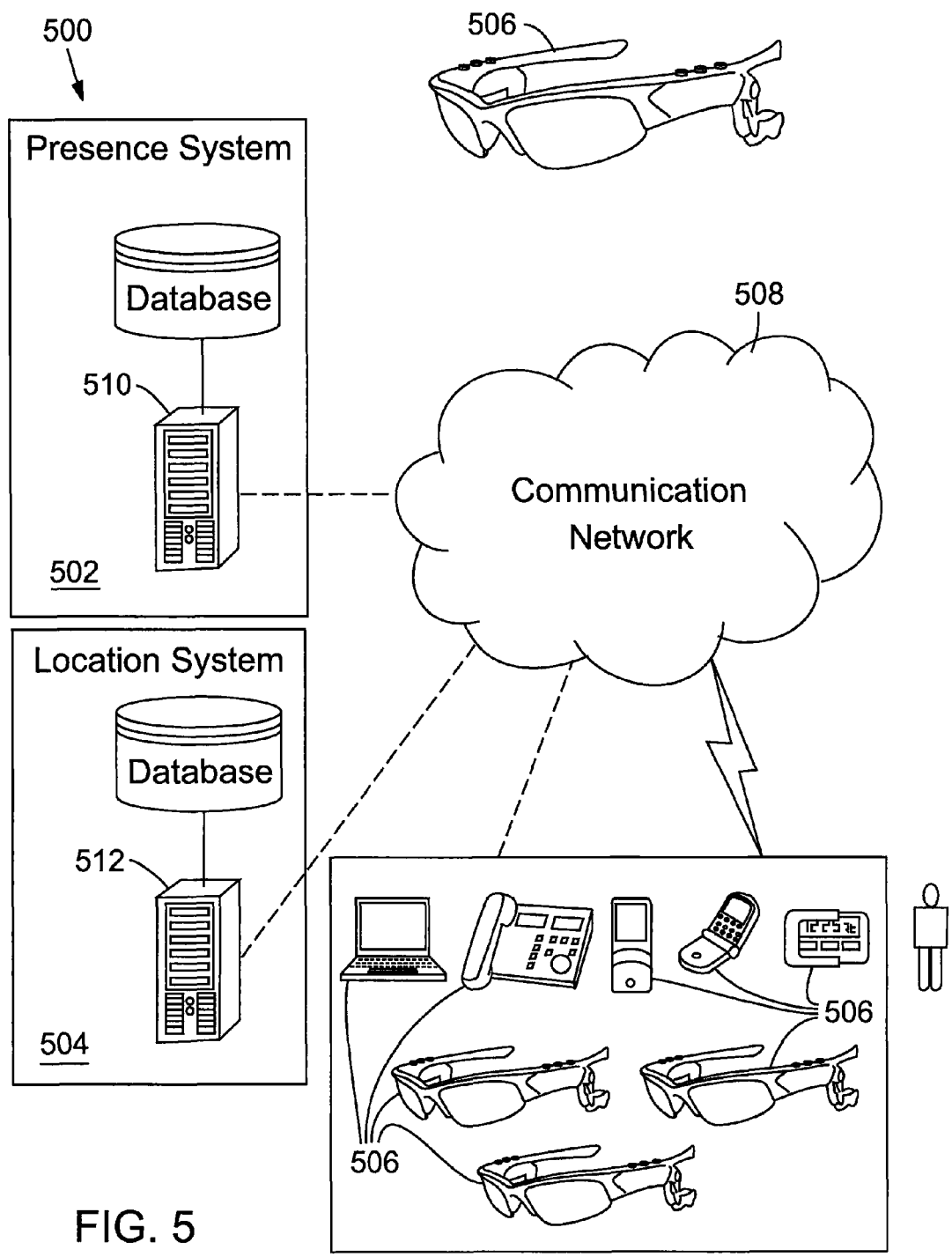
FIG. 5 illustrates an example of a head-mounted embodiment of the assisted guidance navigation system within a networked environment.

FIG. 5 depicts an exemplary block diagram for the navigation system according to the following example:

Size:
    Dimensions 113×59×23 mm
    Weight 178 g

Display:
    Braille keypad
    65K colors Size 320×320 pixels
    44×44 mm
    Accelerometer sensor for auto-rotate Navigation:
    Touch screen
    Backlit QWERTY keyboard
    Five-way navigation button architecture Camera:
    3.15 MP, 2048×1536 pixels, autofocus, video, secondary VGA videocall camera Memory:
    128 MB of memory (64 MB of RAM and 64 MB of Flash ROM)
    24 MB built-in user available memory CPU:
    Intel's® PXA270 running at 312 MHz (Pentium D®)

Expansion slots:
    MiniSD, SD/MMC (+SDIO)
    Modular plug-in SD card for future expansion OS:
    Standard Windows Mobile®

External Interfaces:
    Mini USB for downloads, maintenance and charging (Slave USB, Power IN)
    Audio, 2.5 mm diameter earphone/microphone jack with stereo sound Battery:
    Removable
    Rechargeable Li-Ion battery
    Stand-by: Up to 300 h
    Run time: Up to 6 h Charger:
    Input: 90~240 V AC, 50/60 Hz
    Output: USB Fast Charge.

Country Certifications required:
    North America, EMC and Safety
    UK, EMC, Safety. RoHS and WEEE
    EU, EMC, Safety. RoHS and WEEE
    Taiwan, Japan, Korea, HK, Japan, EMC and other specific compliance requirements, e.g. PSE
    China, EMC, Safety, and other specific compliance requirements e.g. CCC Operating conditions:
    Ambient temperature of 0° C. to +55° C.
    Relative humidity in the range of 10% and 90% non-condensing
    Abrasion resistance
    Water resistance Storage conditions:
    Storage temperature in the range of −40° C. to +85° C.

Packaging:
    Bulk
    Retail
    Accessories
    Documentation

Figure 6:
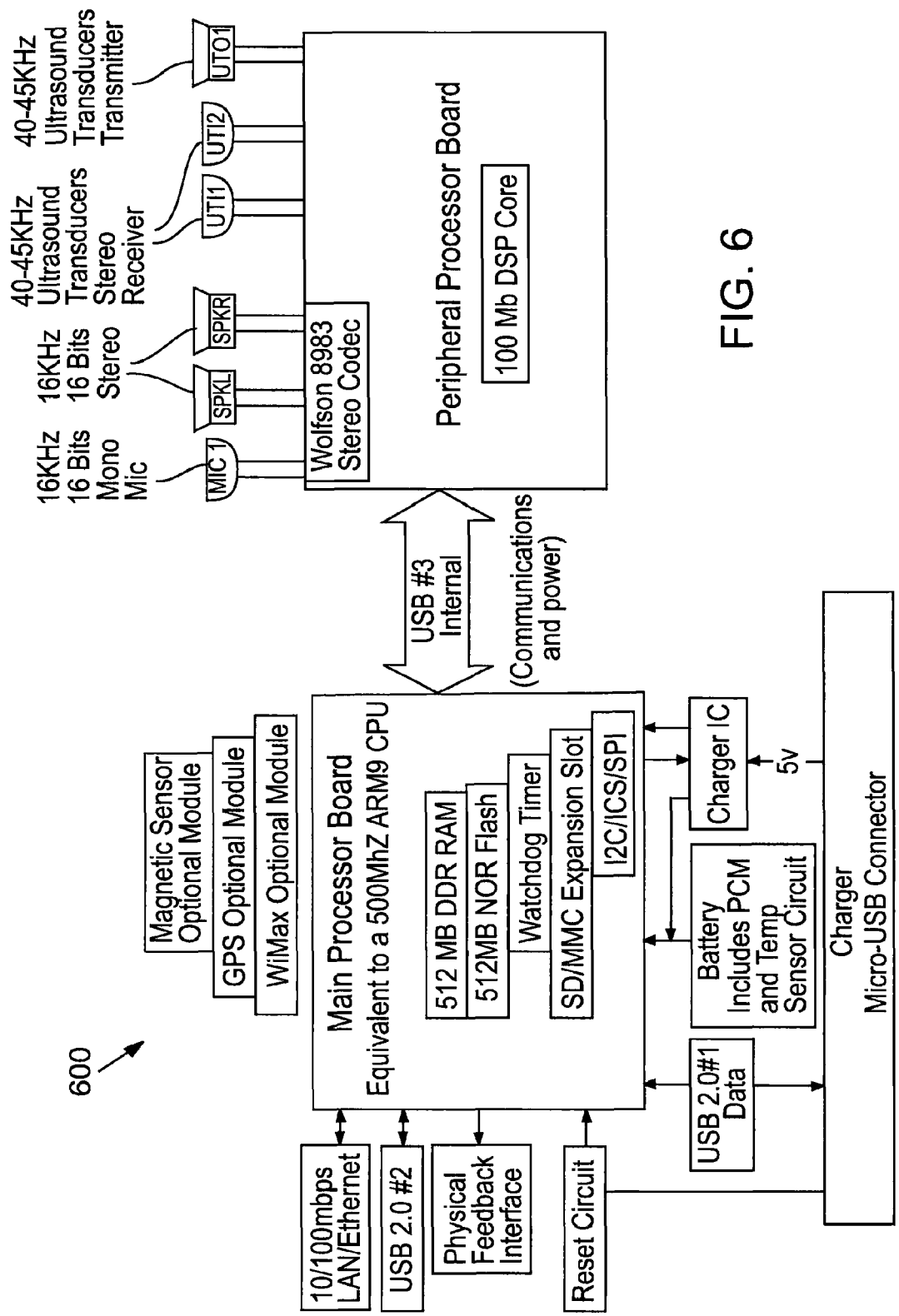
FIG. 6 illustrates an example of an assisted guidance navigation system within a communications environment.

Options:
    Customized GPS 16 as an add on option
    802.16 as an add on option FIG. 6 depicts an exemplary embodiment of a communication system 600. FIG. 6 is a specific example of the communication system illustrated in FIG. 5. Ranges of various components in FIG. 6 are different in other exemplary embodiments. For example, in an alternative example, the transducers are electrodynamic transducers within a range of 30-90 kHz. Referring again to FIG. 5, the communication system 500 can comprise a presence system 502, a location system 504, and one or more terminal devices 506 coupled through a communication network 508. The foregoing components 502-508 of the communication system 500 can utilize common computing and communications technologies to support circuit-switched and/or packet-switched communications.

The presence system 502 can be utilized to track the whereabouts and status of the user communicating with one or more of the terminal devices 506 in the communications network 508. For example, users of navigation system (in this example, sunglasses) can detect each other in a multi-user environment. In the arrangement shown, the presence system 502 can include a controller element 510 that supplies system presence information associated with the user. The controller element 510 can initiate a communication session with a communication device identified in the communication system 500 to supply the called party with presence information.

The location system 504 can be utilized to identify a location of the user with the sunglasses 506. In the arrangement shown, the location system 504 includes a controller element 512 that initiates a data session with a global positioning system (GPS). The controller element 512 may be a processor, a programmable storage medium, a server, or any other suitable communication component.

The communication supplied by the user or a calling party can include a caller ID retrieved from a call initiated by the calling party over the communication network 508 utilizing common means, and/or a voicemail message supplied thereby. The location system 504 can identify the calling party via caller identification (ID). The location system 504 can also record a communication identifier associated with the communication device of the called party, such as a caller ID. In such regard, the location system 504 can provide contact information of the calling party and/or the called party to the presence system 502. The location system 504 may include technology such as found in an interactive voice response (IVR) system for interacting with the calling and called parties utilizing voice and keyed input signals (e.g., DTMF tones), and for processing a voice mail message supplied by the calling party according to a particular call flow design.

The presence and location systems 502, 504 can be provisioned to interact cooperatively to enhance processing of location and communication information. In particular, the location system 504 can record a message supplied by the user directed to a called party, and initiate an interactive communication session with a communication device (e.g., sunglasses 506) of the called party to supply the voice message.

The communication network 508 comprises a number of common network elements interconnected by wired or wireless interfaces that support packet-switched and/or circuit-switched technologies. The communications network 508 can thus offer terminal devices 506 Internet and/or traditional voice services such as, for example, POTS (Plain Old Telephone Service), Public Switched Telephone Network (PSTN), VoIP (Voice over Internet Protocol) communications, IPTV (Internet Protocol Television), broadband communications, cellular telephony, as well as other known or next generation access technologies.

The terminal devices 506 can represent any number of embodiments including without limitation a laptop or desktop computer, other sunglasses, a POTS phone, a personal digital assistance (PDA), a cellular phone, or paging device, just to name a few. Some or all of these devices can interface with the communication network 508 with a wired or wireless interface. For example, the laptop can be interconnected to the communications network 508 by a wired Ethernet port to a DSL (Digital Service Line) interface in a residence or enterprise, or by an IEEE802.x Wireless Local Area Network (WLAN), Wireless Fidelity (WiFi) or Worldwide Interoperability for Microwave Access (WiMAX) wireless connection. Optionally, the laptop can be interconnected to the communications network 508 using any other wireless technology including GSM/CPRS. The POTS phone can utilize cordless 2.4 GHz or 5.8 GHz technology for short-range roaming, and interface to the communications network 508 using POTS or VoIP communications. The PDA and cellular phone can support common wireless access technologies for interfacing to the communications network 508. Any of these technologies optionally may be coupled with a camera that provides video feedback on request. For example, a micro video camera can provide video feedback upon request via a GSM/GPRS or WiMAX connection to the communications network 508. This feedback can be used by a remote assistance service so that a remote assistant 1152 (human or a computer) is able to help navigate the user by providing feedback based on the assistant 1152's view of the user's environment.

Additionally, functions of the aforementioned terminal devices 506 in FIG. 5 can be combined so as to create a multifunctional or multimode communication device. For example, VoIP, paging, email, calendaring, WiFi, WiMAX, and cellular communication functionality of location determination of the user can be integrated into the PDA. FIG. 6 illustrates an exemplary embodiment of a navigation system 600 that embodies features of the navigation systems illustrated in FIGS. 1-5.

Figure 7:
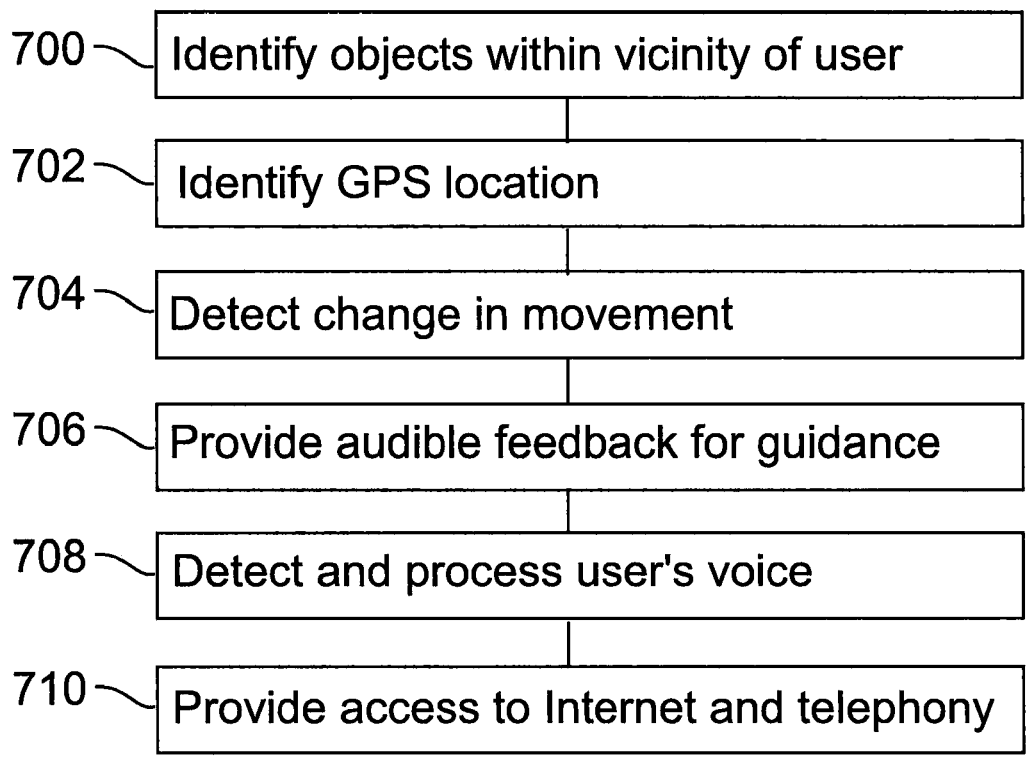
FIG. 7 illustrates steps of a method for providing assisted guidance navigation in accordance with aspects of the disclosure.

FIG. 7 depicts an exemplary method for assisted guidance navigation by way of the navigation system and a communications system. The method can be practiced with more or less than the number of steps shown and is not limited to the order shown. The method begins at step 700 in which the navigation system identifies objects within the vicinity of the user. The objects are identified relative to the user's head orientation in the head-mounted (e.g., sunglasses) example. As previously noted, the sensor array identifies features of objects (e.g., size, stationarity, density, etc.) within proximity of the user.

At step 702 the navigation system identifies the user's location through a GPS. As an example, the GPS location is used in conjunction with the object location from the previous step to identify landmarks. For instance, Google Maps by way of the communication system indicates GPS locations of buildings and landmarks that are evaluated against features of the detected objects. The GPS is also used to track the whereabouts and the direction of the user, for instance, if the user has reached a destination entered in by way of the user interface. In an example, the GPS identifies that a geographic location of the user is near a government building. The short-range sensors detect a large building-like structure within the user's environment. The navigation system identifies the large building-like structure as the government building based on the information from the GPS and the short-range sensors.

At step 704 the navigation system detects change(s) in movement of the user, for example, by way of the accelerometer and can flag an interrupt based on the movement. For instance, upon detecting an abrupt movement possibly caused by a fall or accident, on an otherwise smoothly continuous path to a destination, the navigation system can detect a possible emergency event by way of the communication system.

At step 706 the navigation system provides audible feedback for guidance in coordination with the object detection and GPS location. Continuing with the example above, the navigation system can generate audible messages to ask the user if the abrupt event was intentional or accidental and respond accordingly. Audible feedback can also include occasionally informing the user of their whereabouts or directions to a destination. Audible feedback also can be coupled with cellular voice processing systems for example to permit the user to accept incoming phone calls, check voice mail, or listen to music. Notably, the voice calls or music can be temporarily interrupted in response to detecting an abrupt change in movement or other possible danger, such as detecting a street crossing by way of GPS or maps, detecting other fast-moving objects within the user's environment, detecting a possible emergency event, or the like.

At step 708 the navigation system detects and processes the user's voice, either in directed commands or natural voice. For instance, the user can speak a command to inquire about an object detected by the navigation system, speak a command to receive directions, speak to place a phone call, or speak to send a voice message. The navigation system optionally includes, or is electronically coupled to, a voice recognition system that can process the user's voice, in a command style or natural speaking style. The navigation system may include any suitable voice recognition system.

At step 710 the navigation system can provide access to the Internet and telephony by way of the communication system. In an example, downloaded or on-line data can be audibly coupled to an earpiece of the sunglasses to provide the user with audible information, such as, map information, business information, residential or commercial information, transportation information (subway, buses, taxis, trains, airplanes and automobiles, etc.), weather information, traffic information, or any other relevant data to the users destination or position as determined by the GPS.

An additional exemplary specification is provided below:
Software modules:
 Linux+Device drivers in Main Processor.
 Interface to Peripheral processor.
 VR module is software algorithm running in DSP.
 Virtual Audio Multiplexing can be software module residing in Peripheral
 Processor module and recombines normal audio sent from Main Processor with processed virtual audio generated on Peripheral Processor from instructions sent by Main Processor.
Security:
 Peripheral Processor can have a "unique hardware KEY" for stream encryption and decryption of data between Main Board.
 When first time configured, Main Processor can connect to service site for registration and will send "KEY".
 Service center can send program with embedded KEY and therefore disable operation with other KEY substitutes.
 KEY information can be hidden
 Program can terminate its operation after time expiry etc., requiring re-program.
Peripheral Processor:
 Can use a Capacitor>100 mF (physical size will be the factor) (in addition to USB power and instead of battery) to reduce activity related power noise. In some embodiments, 2×1 Farad for a total of 2,000 mF.
 Can receive micro-commands and provide responses, 16 KHz/16 bit acquisition (mono) microphone for commands, 40-100 KHz mono transmission (1 channel) and acquisition (3+ channels) for 16 KHz/16 bit stereo audio delivery and serial stream encryption and decryption. DSP of 80-100 MIP's may suffice.
 Virtual audio is processed on peripheral board with "vector instructions" from main board.
 VR is "voice recognition" multiplexing of information relating to mixing of virtual sound produced by the peripheral board and "instructions" sent from main module. These instructions can be from GPS etc.
I/O:
 Out: 2 channels 16 KHz/16 bit stereo speakers, inputs are multiplexed from main board reception of normal stereo and virtual processed on peripheral board.
 Out: 1 channel 40-100 KHz ultrasound transducer, signals encoded with "unique hardware KEY" to discriminate every user in a multi-user environment.
 In: 1 16 KHz/16 bit mono microphone digitized and send to VR software module on main.
 In: 3 stereo 40-100 KHz Ultrasound transducers, digitized partial processing and send to main for further processing. Echo signal returns accepted only for "unique hardware KEY" to discriminate for only own returns (to filter out other users' signals in a multi-user environment).
Basic Processor to/from Peripheral:
 View the functionality as digital USB stream to and from peripheral board and on board A/D and D/A functionality.
 Can be powered by USB and can have some self power (e.g., capacitor)
 1 channel of 16 KHz/16 bit for analog in and digital transfer for Voice
 Recognition engine.
 2 channels for digital input and after processing analog outputs, audio earbuds.
 For 40-100 KHz 1 channel for digital input and after processing analog output for signal drive, 3 channels of analog input and digital transfer.
 3 independent channels and 2 pairs of dependent channels
 Rugged but not ruggedized, to be worn.
 Temperature range is from −20° C. to +70° C. and operation can be fanless
 Shock and Vibration components (e.g., motor)
 Water proofing added (e.g., sealing).

The following section describes acoustic features of a sensor array with respect to frequency and temporal features of the transmit and receive sensor signals. It is the variations in these aspects that produce echolocation signals suited for different acoustic environments and ranging.

Frequency Modulation and Constant Frequency: Echolocation calls can be composed of two different types of frequency structures: frequency modulated (FM) sweeps, and constant frequency (CF) tones. A particular call can consist of either or both structures. An FM sweep is a broadband signal—that is, it contains a downward sweep through a range of frequencies. A CF tone is a narrowband signal: the sound stays constant at one frequency throughout its duration.

Intensity: Echolocation calls have been measured at intensities anywhere between 60 and 110 decibels. The call intensity can be modified mid-call, lowering the intensity as the user approaches objects that reflect sound strongly.

Harmonic composition: Calls can be composed of one frequency, or multiple frequencies comprising a harmonic series. In the latter case, the call is usually dominated by a certain harmonic ("dominant" frequencies are those present at higher intensities than other harmonics present in the call).

Call duration: A single echolocation call (a call being a single continuous trace on a sound spectrogram, and a series of calls comprising a sequence or pass) can last anywhere from 0.2 to 100 milliseconds in duration, depending on the environment. For example, the duration of a call can decrease when the user is approaching an object—this enables the sensor array to call more rapidly without overlap of call and echo. Reducing duration comes at the cost of having less total sound available for reflecting off objects and being received or detected by the sensor array.

Pulse interval: The time interval between subsequent echolocation calls (or pulses) determines two aspects of perception. First, it establishes how quickly the sensor array auditory scene information is updated. Secondly, the pulse interval determines the maximum range for which the sensor array can detect objects. For example, a pulse interval of 100 ms allows sound to travel in air roughly 34 meters for detecting objects as far away as 17 meters (the sound has to travel out and back). With a pulse interval of 5 ms, the sensor array can only detect objects up to 85 cm away. Therefore the sensor array constantly has to make a choice between getting new information updated quickly and detecting objects far away.

Figure 8:
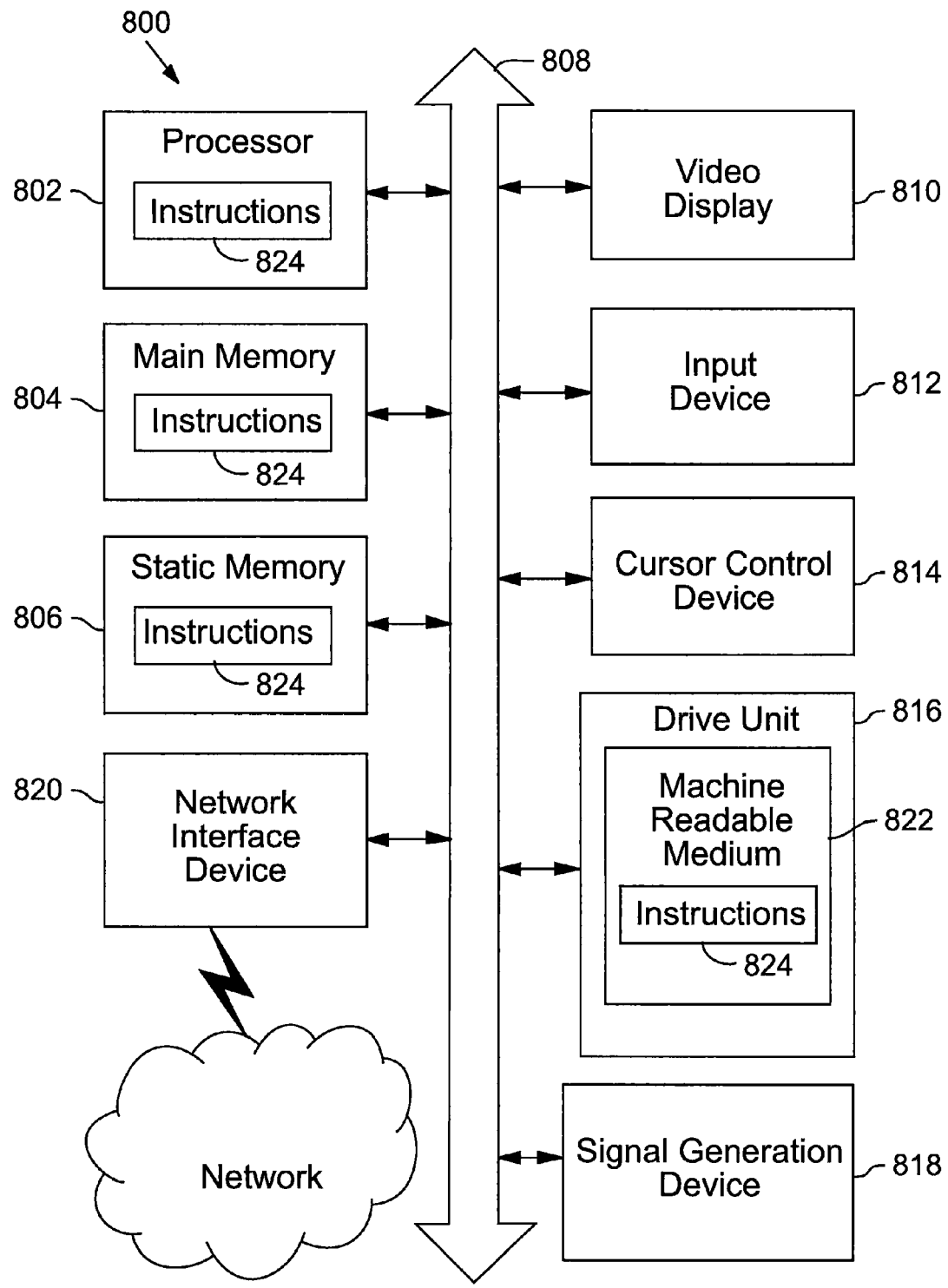
FIG. 8 illustrates an exemplary computer system capable of executing machine-executable instructions in accordance with aspects of the disclosed assisted guidance navigation system.

FIG. 8 depicts an exemplary schematic diagram of a machine in the form of a computer system 800 within which a set of instructions, when executed, may cause the machine to perform any one or more of the methodologies discussed above. In some embodiments, the machine operates as a standalone device. In other embodiments, the machine is connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit, a graphics processing unit, or both, a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT), or the like). The computer system 800 may include an input device 812 (e.g., a keyboard or voice recognition and interpretation module), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions 824 (e.g., software) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" also may be taken to include any medium that is capable of storing, encoding or carrying a set of instructions for execution by the machine and that causes the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Optional features may be added to any of the aspects of the assisted guidance navigation described above. For example, headphones with speaker and microphone capabilities may be included in the navigation system to help the users communicate with their navigation systems with verbal instructions or commands. The users also may communicate with their navigation systems through wireless speakers and microphones, keyboards, or any other input device. An Mp3 player or other audio player or radio may be incorporated into the navigation system for entertaining the user. Decorative features such as various colors and styles of the navigation system may be incorporated, as suitable for the user. Any suitable optional features may be included in the navigation system.

Similarly, individual elements or features of a particular aspect of the assisted guidance navigation are generally not limited to that particular aspect, but, where applicable, are interchangeable and can be used in a selected aspect, even if not specifically shown or described. The same also may be varied in many ways. Such variations are not to be regarded as a departure from the invention, and all such modifications are intended to be included within the scope of the invention.

The examples described above relate to applications of the invention that assist the visually-impaired. The disclosed assisted navigation systems are useful in many other applications as well. For example, users attempting to navigate in an environment with limited visibility will find the disclosed assisted guidance navigation systems useful. For example, the military, firefighters, and other entering environments with low visibility would find this navigation system very useful. In examples in which users without vision impairment (or without extreme vision impairment) use the disclosed assisted guidance navigation system, the feedback provided to the user can be any suitable feedback, including visual feedback including but not limited to photos, video, light bursts, and the like. Any combination of visual, audio, and touch (e.g., vibration) feedback can be used in any of the embodiments of the disclosed assisted navigation systems.

Figure 9:
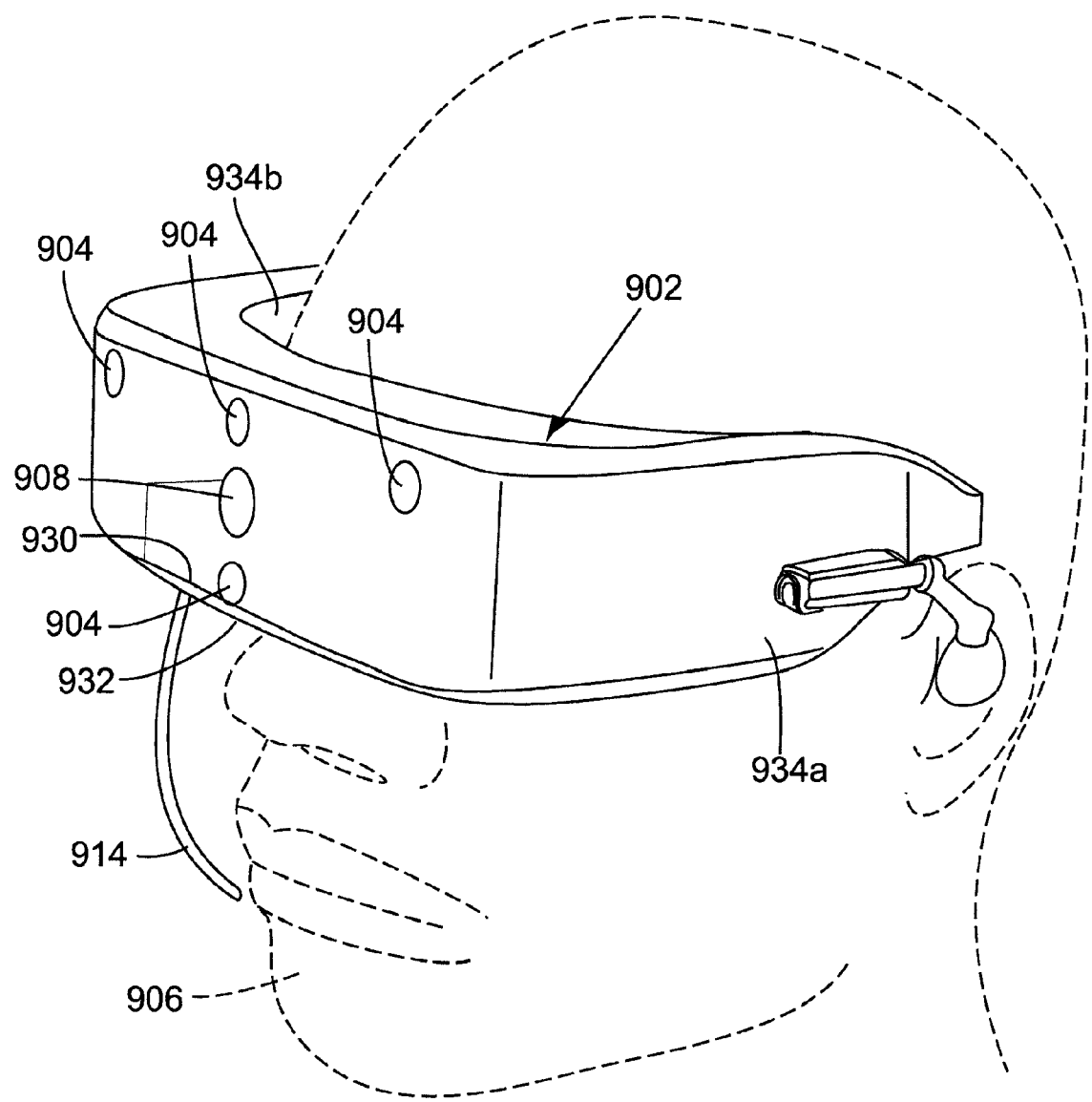
FIGS. 9-11 are various perspective views of another embodiment of a head-mounted embodiment of the disclosed assisted guidance navigation system.
Figure 10:
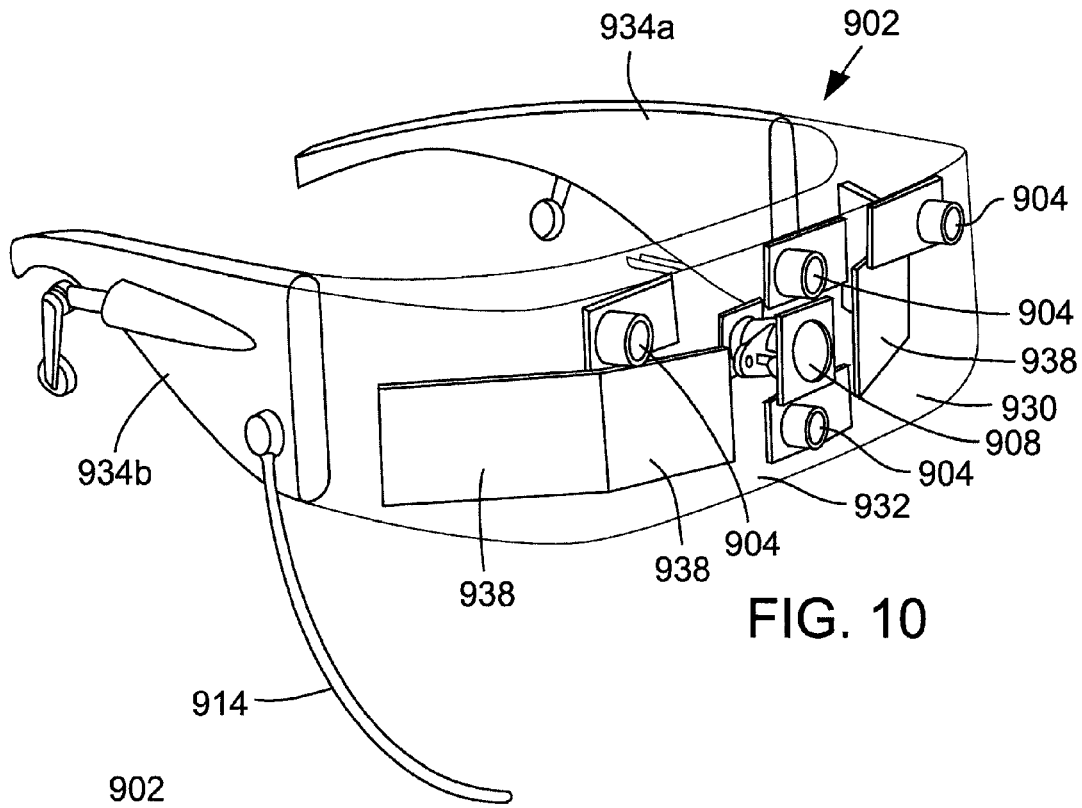
Figure 11:
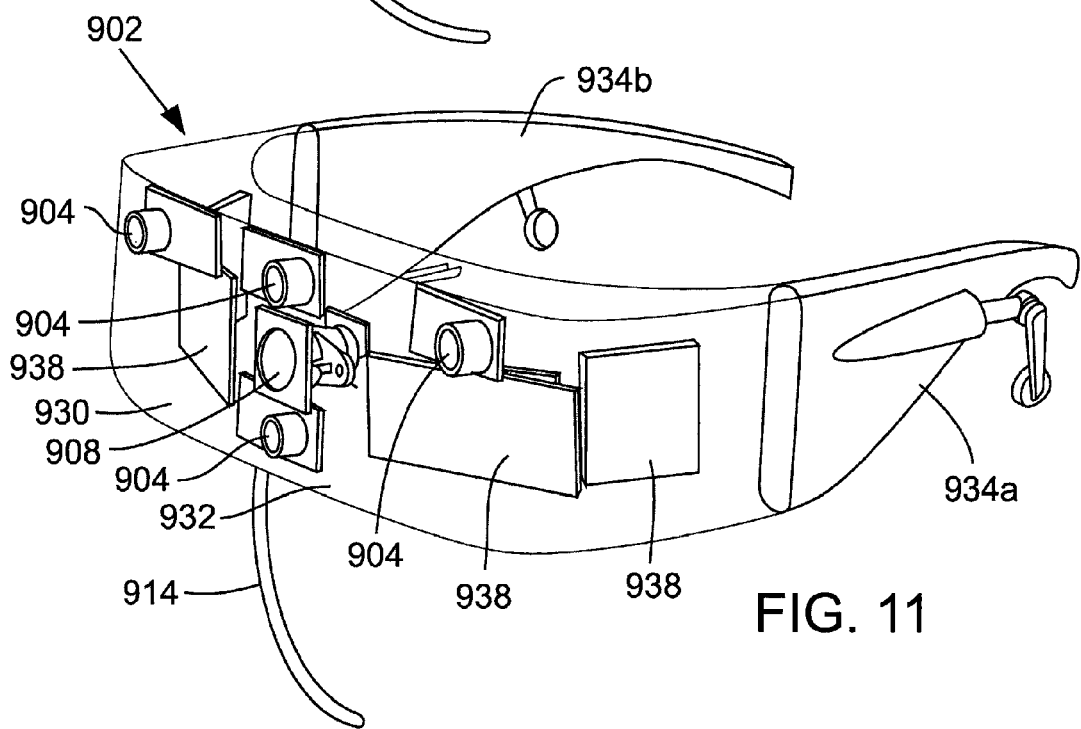

Referring now to FIGS. 9-11, additional embodiments of the head-mounted device 902 will be discussed. Components that correspond to those of the embodiments of FIGS. 1 and 2 are indicated with corresponding reference numbers increased by 800.

As shown, the head-mounted device 902 can be shaped like sunglasses, similar to the embodiments discussed above. Specifically, the head-mounted device 902 can include a base 930. The base 930 can be shaped like sunglasses and can fit comfortably to the head of the user 906 so as to substantially cover the eyes of the user 906. Also, the base 930 can be made out of a substantially opaque or polarized material. As shown in FIGS. 10 and 11, the base 930 can include a front portion 932 (shown in phantom) and two side portions 934a, 934b. The front portion 932 can cover the eyes of the user 906, and the side portions 934a, 934b can extend and fit over respective ones of the ears of the user 906.

Figure 12:
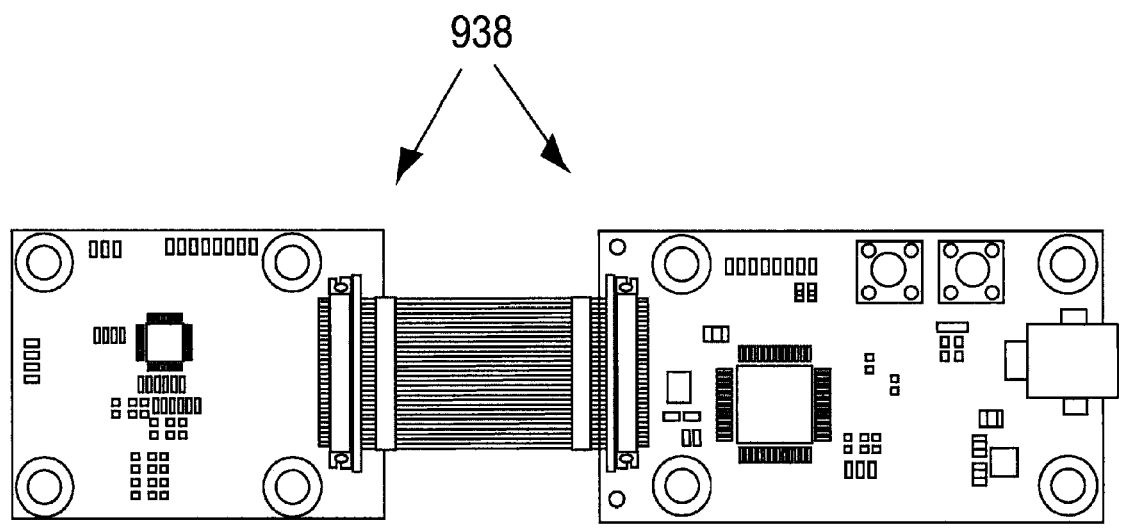
FIGS. 12-14 are various top views of circuit assemblies for the head-mounted embodiment of the disclosed assisted guidance navigation system.
Figure 13:
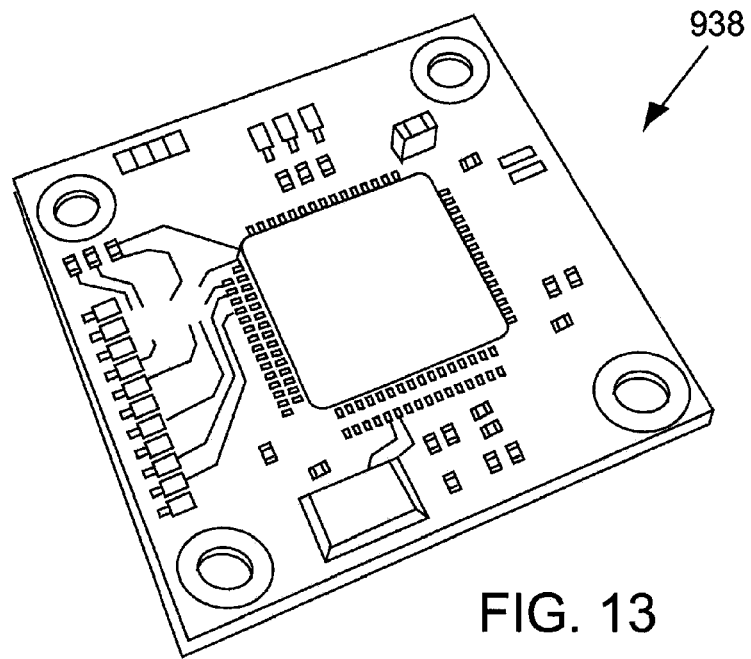
Figure 14:
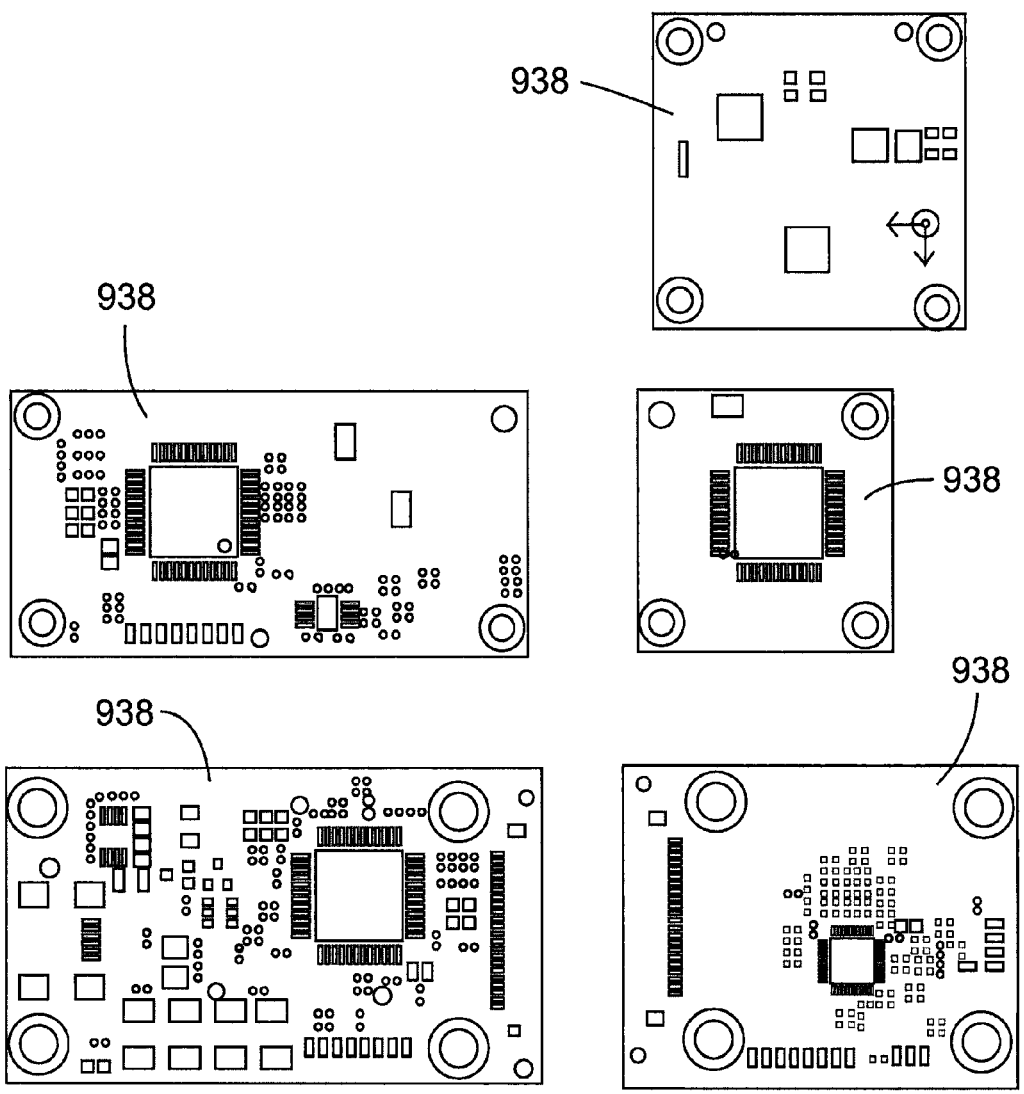

Also, the head-mounted device 902 can include a sensor array 904, one or more transducers 908, and the like. Moreover, the device 902 can include one or more specific components (e.g., a camera, a microphone, speaker(s), other components of an audio/video system, a navigation unit, a controller, a memory, a transceiver, power supply, etc.) for gathering and transmitting audio and visual data, for saving data, etc. as discussed above and illustrated, for instance, in FIGS. 1-8. In particular, the camera can gather moving video or still picture images, infrared, thermal imaging, or any other type of video data. These components can be mounted to and operably supported by the base 930 as shown in FIGS. 10 and 11. Moreover, the head-mounted device 902 can include one or more circuit assemblies 938 as shown in FIGS. 12-14. The circuit assemblies 938 can be operably coupled to corresponding components, such as the sensor array 904, transducers 908, camera, audio system, etc., and the circuit assemblies 938 can be mounted to and operably supported by the base 930 as shown in FIGS. 10 and 11.

Figure 15:
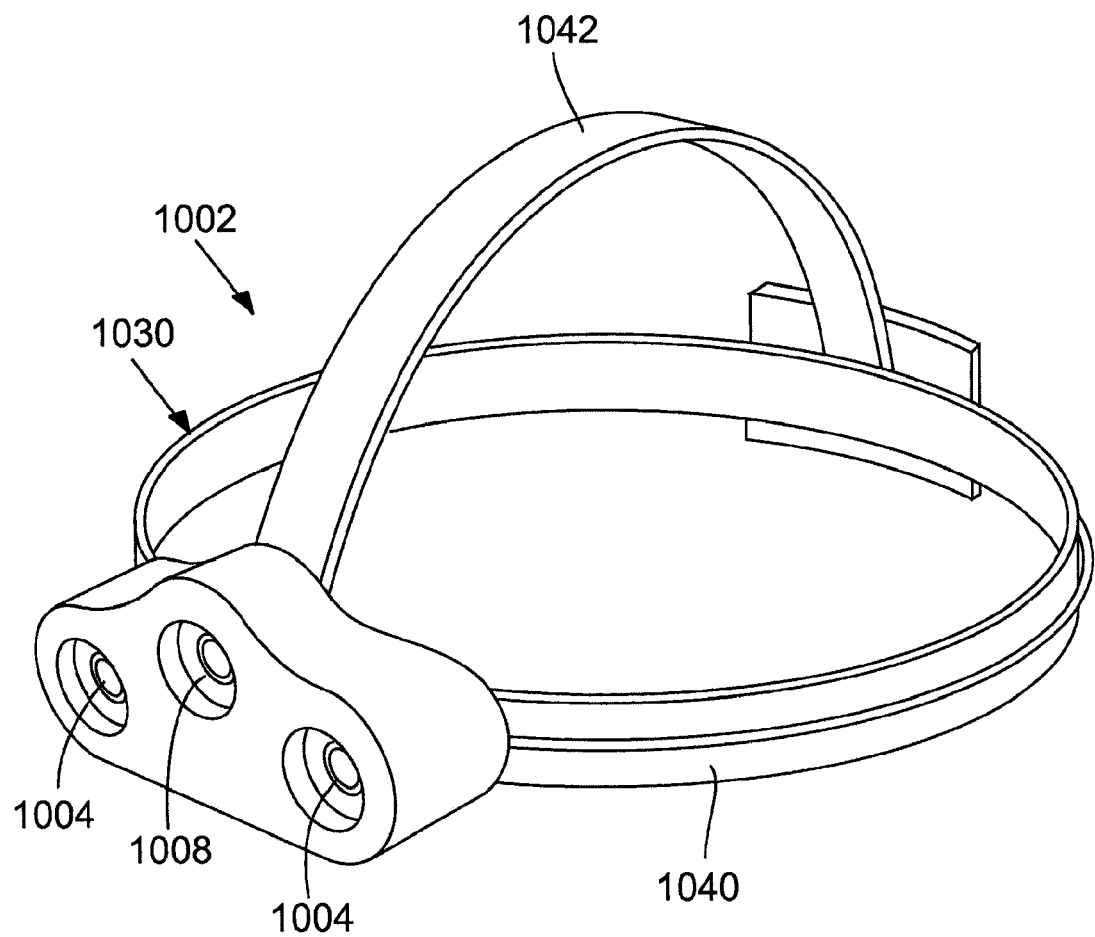
FIG. 15 is a perspective view of additional embodiments of a head-mounted embodiment of the disclosed assisted guidance navigation system.

Referring now to FIG. 15, other exemplary embodiments of the head-mounted device 1002 will be discussed. Components that correspond to those of the embodiments of FIGS. 1 and 2 are indicated with corresponding reference numbers increased by 900.

As shown, the head-mounted device 1002 can include a base 1030. The base 1030 can include a headband 1040 and a top strap 1042. The headband 1040 can encircle and extend continuously about the head of the wearer (not shown). The top strap 1042 can be connected at both ends to the headband 1040 and can extend over the top of the head of the wearer (not shown). The base 1030 can be resiliently flexible.

The head-mounted device 1002 can additionally include a sensor array 1004, one or more transducers 1008, and the like. Moreover, the device 1002 can include one or more specific components (e.g., a camera, speakers, microphone, other components of an audio/video system, a navigation unit, a circuit assembly, a controller, a memory, a transceiver, power supply, etc.) for gathering and transmitting audio and visual data, for saving data, etc. as discussed above and illustrated, for instance, in FIGS. 1-8. These components can be mounted to and operably supported by the base 1030 as shown in FIG. 15. When worn by the user, the components can be disposed above the eyes of the user.

Thus, it will be appreciated that the head-mounted device 1002 is unlikely to block the eyes of the wearer during use. This is unlike the sunglasses-type head-mounted devices 102, 902 described above. Accordingly, the head-mounted device 1002 of FIG. 15 can be useful for users that may not want their natural vision blocked by the device 1002. Specifically, the device 1002 can be useful for fire response workers, soldiers, or others whose vision might be temporarily obscured (e.g., by smoke, debris, etc.). On the other hand, the sunglasses-type head-mounted devices 102, 902 can be useful for permanently or long-term vision-impaired users.

Figure 16:
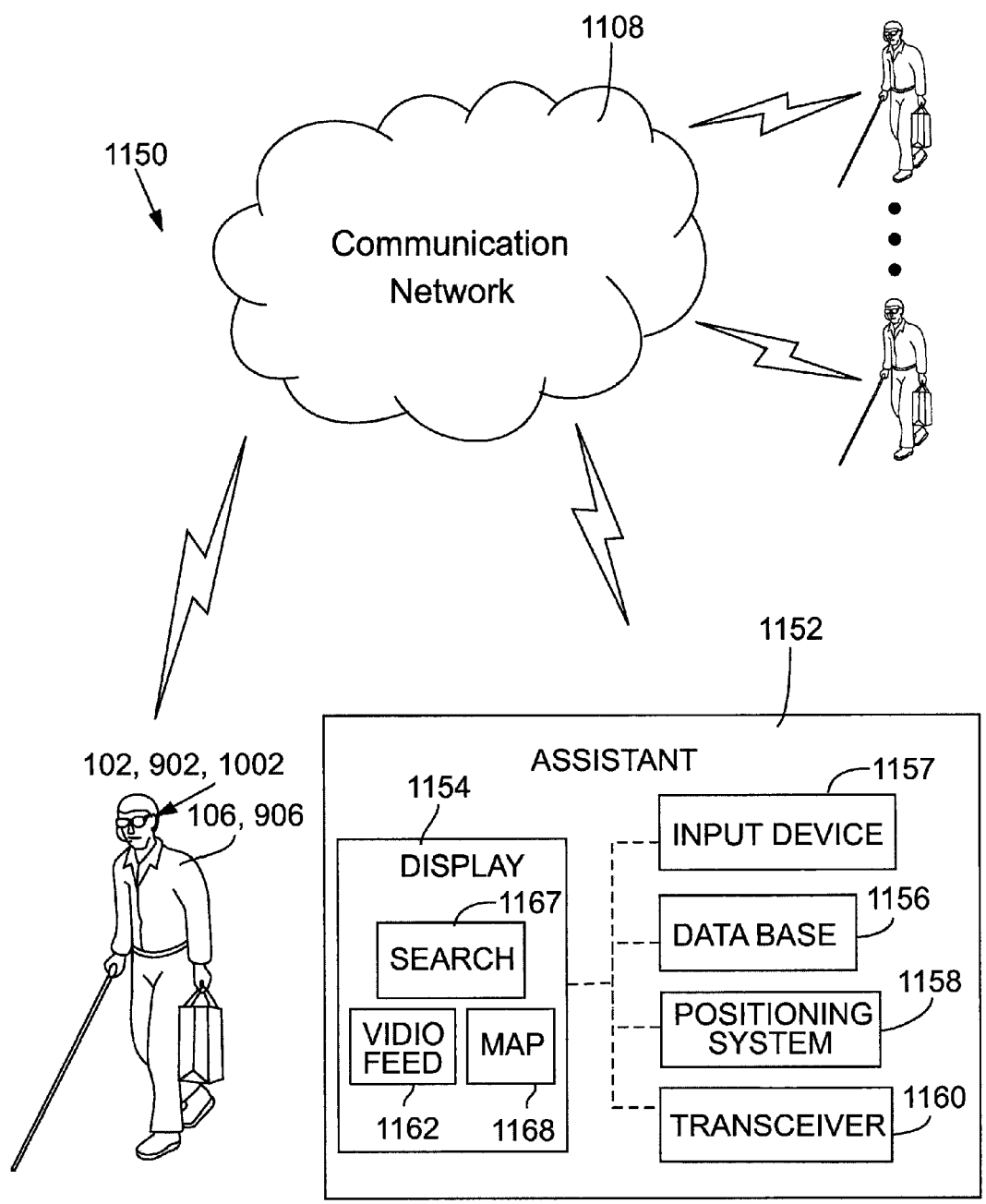
FIG. 16 is a schematic illustration of additional embodiments of the disclosed assisted guidance navigation system for providing remote assistance.

Referring now to FIG. 16, a system 1150 according to the present teachings is schematically illustrated. As will be discussed, one or more of the head-mounted devices 102, 902, 1002 can be incorporated in the system 1150. The system 1150 can also include one or more devices that are available to a remote assistant 1152 (i.e., "assistant device," etc.). Thus, although the user 106, 906 and the assistant 1152 are remote from each other, the assistant 1152 can communicate with and provide valuable assistance to the user 106, 906 as will be discussed in greater detail.

The head-mounted device 102, 902, 1002 (and, thus, the user 106, 906) can wirelessly communicate with the assistant 1152 via a communication network 1108 (e.g., 3G, 4G, GSM/GPRS/WiFi, etc.), similar to the embodiments discussed above. In some embodiments, the communication network 1108 can be a global communication network 1108 (e.g., cellular phone network, internet, satellite communication system, etc.). Accordingly, as will be discussed, audio and/or visual data can be transmitted between the user 106, 906 and the assistant 1152.

Specifically, the camera 408 or other visual data collector on the head-mounted-device 102, 902, 1002 can obtain one or more images of an area adjacent the user 106, 906 (e.g., the area immediately in front of the user 106, 906). This image can be a still image or a moving image (e.g., a collection of still images that are strung together in succession to show movement). The image can be transmitted to the assistant 1152 such that the assistant 1152 can view the image remotely. Then, the assistant 1152 can generate and transmit a responsive message relating to the image. The audio system 404 (e.g., a speaker) of the head-mounted device 102, 902, 1002 can output the assistant's message to the user 106, 906. Accordingly, the assistant 1152 can help to interpret what is shown in the area surrounding the user 106, 906. Moreover, in some embodiments, the assistant 1152 can provide guidance as the user 106, 906 travels to a destination (e.g., to avoid obstacles during travel, etc.).

The assistant 1152 can be any live person that remotely communicates with the user 106, 906. For instance, in some embodiments, the assistant 1152 can be a parent of the user 106, 906 or another person known personally by the user 106, 906. Also, in some embodiments, the assistant 1152 can be a commercial service provider as will be discussed. Additionally, in some embodiments, the assistant 1152 can be a member of a police or fire department or other emergency responder. It will be appreciated that an automated assistant 1152 can be available in addition to or as an alternative to a live assistant 1152. The assistant 1152 can have access to a personal computer or other electronic equipment for establishing communication with the user 106, 906, for data searching, for storing information in computerized memory, etc. Furthermore, although only one assistant 1152 is shown in FIG. 16, it will be appreciated that the system 1150 can utilize any number of assistants 1152 for providing assistance to any number of users 106, 906.

The assistant 1152 can have access to a display 1154. The display 1154 can include a computer screen, a cell phone screen, a projector, or any other suitable display 1154. The display 1154 can display the image 1162 sent from the camera 408 of the head-mounted device 102, 902, 1002. In some embodiments, the display 1154 can display a website or other prepared content that has been customized for the particular user 106, 906. This website can have a specific URL or address and can be password-protected.

The assistant 1152 can also have access to an input device 1157, such as a microphone, a keyboard, etc., for inputting one or more messages that are transmitted back to the user 102, 902, 1002. For instance, upon seeing the image 1162 on the display 1154, the assistant 1152 can speak into a microphone of the input device 1157, and this audible message can be audibly output by the audio system 404 of the head-mounted device 102, 902, 1002. Accordingly, the user 106, 906 can receive guidance from the assistant 1152.

Also, the assistant 1152 can have access to a database 1156. The database 1156 have one or more maps 1168 available thereon. The maps 1168 can be elevational-view maps, street-level maps, etc. The maps 1168 can be stored in local memory or can be a remotely accessible by the assistant 1152.

The assistant 1152 can also have access to a positioning system 1158, which determines a current position of the user 106, 906 on one or more of the maps 1168 stored in the database 1156. For instance, the positioning system 1158 can be in operative communication with the navigation unit 402 (e.g., Global Positioning System, GPS, etc.) included on the head-mounted device 102, 902, 1002 of the user 106, 906 to determine the user's location, and the database 1156 can be operable to search and find a map 1168 of that location. Then, the display 1167 can indicate the user's location on the map 1168 (e.g., with a cursor or icon). In some embodiments, the display 1154 can update changes in the user's location on the map 1168 (e.g., by a cursor or icon that moves on the map 1168) to show the user's movement.

Furthermore, the assistant 1152 can be in communication with the user 106, 906 via a transceiver 1160. The transceiver 1160 can provide two-way communication between the assistant 1152 and the user 106, 906, and the transceiver 1160 can include any of the wireless transmitters, receivers, etc. discussed herein.

Also, the two-way communication between the user 106, 906 and the assistant 1152 can occur over a communication network (communication device) 1108. The communication network 1108 can be internet-based, can be a cellular network, or can be of any other type. The assistant's transceiver 1160 and the user's transceiver 414 can communicate with each other over the network 1108. Also, the communication network 1108 can provide communication between any number of users 106, 906 and any number of assistants 1152.

Visual, audio, and other data can be compressed and encoded for transfer over the network 1108. Thus, as mentioned above, the image 1162 can be displayed on the display 1154 of the assistant 1152 such that the assistant 1152 can remotely view the surrounding area of the user 106, 906, and the assistant 1152 can respond by transmitting one or more audio messages back to the user 106, 906. This exchange can occur in largely real time. Accordingly, the assistant 1152 can provide instructions or other guidance to the user 106, 906 while simultaneously seeing the surroundings of the user 106, 906 shown in the image 1162. For instance, the assistant 1152 can provide audible directions over the communication network 1108 to help steer the user 106, 906 around obstacles that are in front of the user 106, 906 or to otherwise direct the user 106, 906 to a desired destination. Also, in some embodiments, the user 106, 906 can hold up an object (e.g., a restaurant menu, etc.) to the camera on the head-mounted device 102, 902, 1002, and the assistant 1152 can audibly describe the object back to the user 106, 906 (e.g., read the items on the menu). It will be appreciated that the assistant 1152 can provide any suitable assistance and/or description of the surroundings of the user 106, 906 in this manner.

As discussed, the assistant 1152 and the user 106, 906 can communicate audibly over the communication network 1108 in real time. Also, in some embodiments, the assistant 1152 can type or otherwise input commands using the input device 1152, and this input can be translated into audible output (e.g., text-to-speech translation), which is output from the speaker(s) in the head-mounted device 102, 902, 1002 to the user 106, 906.

Also, the assistant 1152 can have access to a searching tool 1167, such as a computerized search engine, etc. Thus, the user 106, 906 can provide search criteria (e.g., using the microphone 114, 914, etc.) to the assistant 1152, and the assistant 1152 can perform a search on behalf of the user 106, 906 using the searching tool 1167. More specifically, if the user 106, 906 wishes to find a restaurant in the area, then the user 106, 906 can request the assistant 1152 to find a restaurant using the searching tool 1167. The user 106, 906 can specify a restaurant with a particular type of food, a restaurant in a close proximity, or other criteria. Using the searching tool 1167, the assistant 1152 can find one or more restaurants that meet the criteria and communicate back with the user 106, 906 to select one of the identified restaurants as a destination. The map 1168 can then display the destination as well as the current location of the user 106, 906. Then, using the map 1168 as well as the image 1162 from the head-mounted device 102, 902, 1002, the assistant 1152 can communicate with the user 106, 906 to guide the user 106, 906 to the destination (i.e., the assistant 1152 can provide a route message to the user 106, 906). Thus, the assistant 1152 can provide turn-by-turn directions and can help steer the user 106, 906 around obstacles on the route to the desired destination. These directions can be audibly output to the user 106, 906 via the speaker of the head mounted device 102, 902, 1002. Also, these directions can be electrically transmitted to a portable device (e.g., a cell phone) of the user 102, 902, 1002 to be processed by the portable device's navigation system.

In some embodiments, the visual data 1162 and the map 1168 can be separate from each other on the display 1154. In some additional embodiments, the visual data 1162 can be visually overlaid on the map 1168 (or otherwise combined) such that the assistant 1152 can see both the surroundings of the user 106, 906 as well as see the location of the user 106, 906 on the map 1168.

Figure 17:
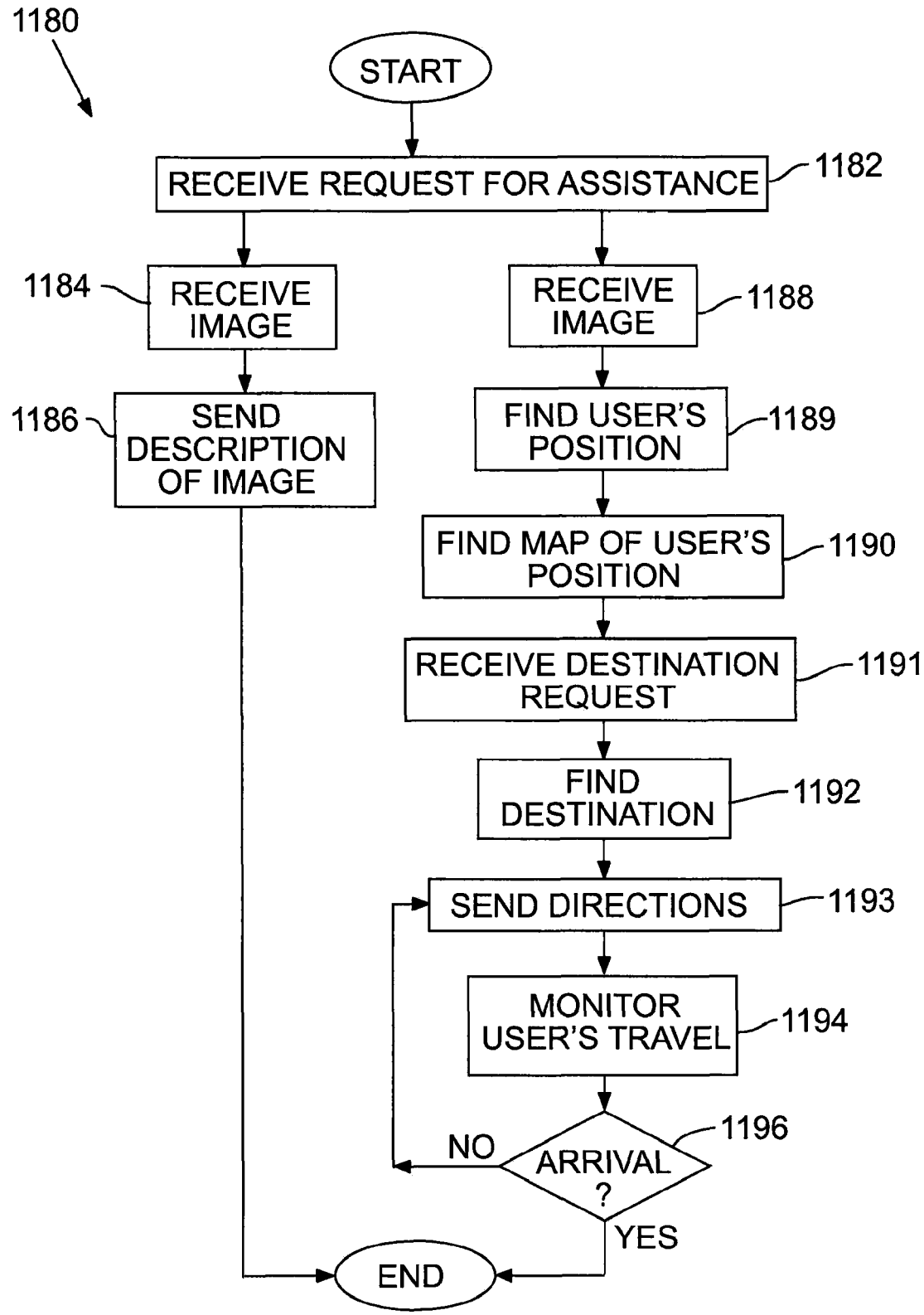
FIG. 17 is a flowchart illustrating a method of operating the remote assistance system of FIG. 16.

Referring now to FIG. 17, a method 1180 of using the system 1150 will be discussed according to various exemplary embodiments. The method 1180 can begin in block 1182, in which the user 106, 906 requests assistance. More specifically, if the user 106, 906 needs assistance, the user 106, 906 can speak or otherwise input a predetermined command (e.g., via voice recognition software) to establish a connection between the user 106, 906 and the assistant 1152 over the communication network 1108. Also, in some embodiments, the assistant 1152 can input a command to establish the connection, independent of the user 106, 906.

Moreover, in some embodiments, the head-mounted device 102, 902, 1002 can include a triggering device (e.g., a motion detector) that automatically connects the user 106, 906 to the assistant 1152. For instance, if the head-mounted device 102, 902, 1002 is accelerated because the user 106, 906 has fallen down, communications between the assistant 906 can the user 106, 906 can be automatically established so that the assistant 1152 can help the user 106, 906.

Once the connection is established, block 1184 can follow, and the image 1162 can be sent from the head-mounted device 102, 902, 1002 to the display 1154. Next, in block 1186, the assistant 1152 can provide a description of what is shown in the image 1162. Thus, the assistant 1152 can help the user 106, 906 discern what is occurring in areas immediately surrounding the user 106, 906. Accordingly, the assistant 1152 can help the user 106, 906 read a menu, identify and find an object, etc.

In additional embodiments, the method 1180 can include block 1188, wherein the image 1162 is received by the assistant 1152, and block 1189 can follow. In block 1189, the positioning system 1158 can determine the user's 106, 906 global position. In some embodiments, the user's current position is sent to the assistant 1152 (block 1189) at predetermined time intervals (e.g., once every second) while the image 1162 is continuously provided and (block 1188) approximately in real time.

Then, in block 1190, the database 1156 can find a corresponding map 1168 of the user's position. The map 1168 and the current position of the user 106, 906 on that map 1168 can also be displayed on the display 1154.

Next, in block 1191, the user 106, 906 can request the assistant 1152 to perform a destination search using the searching tool 1167. For instance, the user 106, 906 can speak search criteria (business names, business types, business locations, etc.) into the microphone 114, 914. In block 1192, the assistant 1152 can perform the search using the searching tool 1167, the assistant 1152 can list off the possible destinations meeting the search criteria back to the user 106, 906, and the user can select the desired destination therefrom. This selected destination can then be displayed on the map 1168 so that the assistant 1152 can perceive how to guide the user 106, 906 from their current location to the destination.

Then, in block 1193, the assistant 1152 can send the user 106, 906 turn-by-turn directions to the destination, instructions for avoiding obstacles on the way to the destination, etc. As shown in block 1194, the assistant 1152 can monitor the user's progress toward the destination by watching the user's current location in relation to the destination on the map 1168 and/or by watching the image 1162 sent from the head-mounted device 102, 902, 1002.

In decision block 1196, it is determined whether the user 106, 906 has arrived at the destination. If not, then the assistant 1152 can send additional directions to the destination in block 1193 and continue to monitor the user 106, 906 in block 1194. Once the user 106, 906 has arrived at the destination and the user 106, 906 states that assistance is no longer necessary, the communication link can be severed, and the method 1180 can end.

Additional assistance can also be provided as well. For instance, in some embodiments, the user 106, 906 can request the assistant 1152 to send a taxi to the user's current location. It will be appreciated that the assistant 1152 can provide any suitable service to the user 106, 906.

In some embodiments, the communication network 1108 could also be configured to allow different users 106, 906 and/or different assistants 1152 to communicate, play games, or otherwise interact with each other, similar to a social network. As such, the network 1108 could be used to form a community of users 106, 906 and/or assistants 1152.

In some embodiments, the system 1150 can be sold and marketed as a commercial service to potential users 106, 906. The user 106, 906 can have various a la carte choices on how to tailor the system 1150 to particular needs of the user 106, 906. For instance, the user 106, 906 can choose the type of assistant 1152 that will be available for assistance (e.g., family members, commercial service providers, and/or law enforcement, etc.). Also, the user 106, 906 can choose the amount of time that the assistant 1152 is available. For instance, the user 106, 906 can choose to have an assistant 1152 available on-demand twenty-four hours per day or can choose to have the assistant 1152 available for only a certain amount of time per month. Moreover, the user 106, 906 can choose between the types of information that are available from the assistant 1152 (e.g., directions, remote reading services, etc.). Each of these choices can affect the prices that the user 106, 906 pays for the system 1150. For instance, the user 106, 906 can pay more for the assistant 1152 to be available twenty-four hours per day as compared to a user 106, 906 that needs the assistant 1152 to be available only an hour per day. Likewise, the user 106, 906 can pay more for a commercial assistant 1152 as compared to an assistant 1152 that is a family member. The users 106, 906 can also purchase these services through a subscription-type plan. Also, in some embodiments, the user 106, 906 can pay on a per-use basis.

Moreover, the system 1150 can be marketed in various ways. For instance, different businesses could commercially provide the hardware (e.g., the head-mounted devices 102, 902, 1002) to consumers while other businesses could commercially provide the services of various commercial assistants 1152. Still other businesses could provide the communication network 1108 discussed above. Also, in some embodiments, one or more of these areas of businesses could be franchised.

It will also be appreciated that the assistants 1152 can be located anywhere. For instance, the assistants 1152 can be located internationally and can individually communicate with the user 106, 906, for instance, over a Voice-Over-Internet-Protocol (VOIP) communication network 1108. The system 1150 can also be configured to accommodate any suitable number of different users 106, 906.

Accordingly, the system 1150 can provide helpful remote assistance to visually impaired or other users 106, 906. Also, the system 1150 can be configured with off-the-shelf components, thereby allowing the system 1150 to be implemented relatively inexpensively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for providing assistance from an assistant to a user, the user and the assistant being remote from each other, the system comprising:

a user device that includes a visual data collector, an audible output device, and a plurality of spaced apart short range echo-location sensors, each of the plurality of the spaced apart short range echo-location sensors configured to transmit a respective signal and each of the plurality of the spaced apart short range echo-location sensors configured to receive all of the respectively transmitted signals such that each received signal to contributes to calculations that detect and triangulate upon objects at a single point in time within the user's environment such that detected objects are prioritized with respect to relevance to the user, the visual data collector configured to obtain an image of an area adjacent to the user, the audible output device configured to audibly output a message relating to the image to the user;

an assistant device including a display and an assistant input device, the display configured to display the image to the assistant, and the assistant input device configured for inputting the message by the assistant;

a communication device that is configured to transmit the image from the user device to assistant device, the communication device also configured to transmit the message from the assistant device to the user device; and, a computer system in communication with the plurality of spaced apart short range echo-location sensors that determines location information about the detected objects within the user's environment and provides the location information to the user through a transducer.

2. The system of claim 1, wherein the visual data collector and the audio output device are portable by the user.

3. The system of claim 2, further comprising a mount configured to be mounted on a head of the user, the mount configured to support the visual data collector and the audio output device on the head of the user.

4. The system of claim 1, wherein the assistant device further includes a database having a map, and further comprising a positioning system that determines a current position of the user on the map, the display configured to display to the assistant the current position of the user on the map.

5. The system of claim 4, wherein the positioning system is configured to update a change in the current position of the user on the map, and wherein the display is configured to display the change in the current position of the user on the map.

6. The system of claim 4, wherein the display is configured to display a destination on the map, the assistant input device being configured for inputting a route message by the assistant, the route message including a plurality of directions for travelling from the current position of user to the destination, the route message also including avoidance information for avoiding an obstacle shown in the image.

7. The system of claim 6, wherein the user device also includes a user input device configured for inputting a destination criteria by the user, wherein the communication device is configured to transmit the destination criteria from the user device to assistant device, and wherein the assistant device further includes a searching device configured for identifying the destination from among a plurality of possible destinations satisfying the destination criteria.

8. The system of claim 1, wherein the assistant input device is configured for inputting a descriptive message that describes the image.

9. The system of claim 1, wherein the visual data collector is configured to obtain a moving image representing the area adjacent to the user.

10. The system of claim 1, wherein the display is configured to display a customized site having content that is customized to the user.

11. The system of claim 1, wherein the user device is a first user device, wherein the visual data collector is a first visual data collector of the first user device, wherein the audible output device is a first audible output device of the first user device, wherein the first visual data collector is configured to obtain a first image of a first area adjacent a first user, wherein the first audible output device is configured to audibly output a first message relating to the first image to the first user, further comprising a second user device that includes a second visual data collector and a second audible output device, wherein the second visual data collector is configured to obtain a second image of a second area adjacent a second user, wherein the second audible output device is configured to audibly output a second message relating to the second image to the second user, and wherein the display is configured to display the first image and the second image to the assistant, and wherein the assistant input device is configured for inputting the first message and the second message by the assistant.

12. The system of claim 1, wherein the assistant input device is a microphone and the audible output device is a speaker that outputs a spoken message that is spoken into the microphone by the assistant.

13. A method of providing assistance from an assistant to a user, the user and the assistant being remote from each other, the method comprising:

obtaining an image of an area adjacent to the user;
obtaining by triangulation at a single point in time, through echo-location sensors transmitting and receiving ultrasonic signals having unique identifiers coded therein, information relating to objects within the user's environment such that objects are prioritized with respect to relevance to the user;
providing the information relating to objects within the user's environment to the user with a transducer;
transmitting the image from the user to the assistant;
displaying the image on a display to the assistant;
transmitting a message generated by the assistant relating to the image from the assistant to the user; and audibly outputting the message to the user.

14. The method of claim 13, further comprising obtaining a map, determining a current location of the user on the map, and displaying to the assistant the current position of the user on the map.

15. The method of claim 14, further comprising updating a change in the current position of the user on the map, and displaying the change in the current position of the user on the map.

16. The method of claim 14, further comprising displaying a destination on the map, and wherein the message includes a route message generated by the assistant, the route message including a plurality of directions for travelling from the current position of the user to the destination, the route message also including avoidance information for avoiding an obstacle shown in the image.

17. The method of claim 16, further comprising:
transmitting, from the user to the assistant, a destination criteria,
identifying, by the assistant, the destination from among a plurality of possible destinations satisfying the destination criteria.

18. The method of claim 13, wherein the message is a descriptive message describing the image.

19. The method of claim 13, wherein obtaining the image includes obtaining a moving image representing the area adjacent to the user.

20. The method of claim 13, wherein displaying the image includes displaying the image on a customized site having content that is customized to the user.

21. The method of claim 13, wherein obtaining the image includes obtaining a first image of a first area adjacent a first user, wherein transmitting the image includes transmitting the first image from the first user to the assistant, wherein displaying the image includes displaying the first image on the display to the assistant, wherein transmitting the message includes transmitting a first message generating by the assistant relating to the first image from the assistant to the first user, and wherein audibly outputting the message includes audibly outputting the first message to the first user, and further comprising:

obtaining a second image of a second area adjacent a second user;
transmitting the second image from the second user to the assistant;
displaying the second image on the display to the assistant;
transmitting a second message generated by the assistant relating to the second image from the assistant to the second user; and
audibly outputting the second message to the second user.

22. A method of providing assistance from an assistant to a vision-impaired user, the user and the assistant being remote from each other, the method comprising:

obtaining a moving image of an area adjacent the vision-impaired user, the moving image obtained from a portable camera that is transportable by the vision-impaired user;
obtaining by triangulation at a single point in time, through echo-location sensors transmitting and receiving ultrasonic signals having unique identifiers coded therein, information relating to objects within the user's environment such that objects are prioritized with respect to relevance to the user;
providing the information relating to objects within the user's environment to the user with a transducer;
transmitting the moving image from the vision-impaired user to the assistant;
displaying the moving image on a display to the assistant;
determining a current position of the vision-impaired user on a map;
displaying the map and the current position on the display to the assistant;
displaying a destination of the vision-impaired user on the display to the assistant;
transmitting a route message generated by the assistant from the assistant to the vision-impaired user, the route message including the route message including a plurality of directions for travelling from the current position of the vision-impaired user to the destination, the route message also including avoidance information for avoiding an obstacle shown in the moving image;
audibly outputting the route message from a speaker to the vision-impaired user, the speaker being transportable by the vision-impaired user.

* * * * *

UNITED STATES PATENT AND TRADEMARK OFFICE
CERTIFICATE OF CORRECTION

PATENT NO. : 9,508,269 B2
APPLICATION NO. : 13/297572
DATED : November 29, 2016
INVENTOR(S) : Milan Slamka Page 1 of 1

It is certified that error appears in the above-identified patent and that said Letters Patent is hereby corrected as shown below:

In the Claims

Claim 13, Line 38, reads "respect to relevance to the user;" however, should read "respect to relevance to the user, the unique identifiers based on a multi-frequency signal;"

Signed and Sealed this
Fifth Day of September, 2017

Joseph Matal
*Performing the Functions and Duties of the*
*Under Secretary of Commerce for Intellectual Property and*
*Director of the United States Patent and Trademark Office*